(12) United States Patent
Scofield et al.

(10) Patent No.: US 12,131,230 B1
(45) Date of Patent: Oct. 29, 2024

(54) FEATURE EQUIVALENCE AND DOCUMENT ABNORMALITY THRESHOLD DETERMINATION

(71) Applicant: Assured Information Security, Inc., Rome, NY (US)

(72) Inventors: Daniel Scofield, Portland, OR (US); Craig Miles, Beaverton, OR (US)

(73) Assignee: Assured Information Security, Inc., Rome, NY (US)

( * ) Notice: Subject to any disclaimer, the term of this patent is extended or adjusted under 35 U.S.C. 154(b) by 925 days.

(21) Appl. No.: 16/984,648

(22) Filed: Aug. 4, 2020

Related U.S. Application Data

(60) Provisional application No. 62/964,885, filed on Jan. 23, 2020.

(51) Int. Cl.
*G06N 20/00* (2019.01)
*G06F 16/906* (2019.01)
*G06F 21/50* (2013.01)

(52) U.S. Cl.
CPC .......... *G06N 20/00* (2019.01); *G06F 16/906* (2019.01); *G06F 21/50* (2013.01)

(58) Field of Classification Search
CPC ........ G06N 20/00; G06F 16/906; G06F 21/50
See application file for complete search history.

(56) References Cited

U.S. PATENT DOCUMENTS

| | | | |
|---|---|---|---|
| 2011/0321003 A1* | 12/2011 | Doig | G06Q 30/0276 717/107 |
| 2013/0170696 A1* | 7/2013 | Zhu | G06V 10/75 382/103 |
| 2013/0254549 A1 | 9/2013 | Greene et al. | |
| 2014/0090061 A1 | 3/2014 | Avasarala et al. | |
| 2014/0172755 A1 | 6/2014 | Dubbels et al. | |
| 2014/0283041 A1 | 9/2014 | Cao et al. | |
| 2014/0365492 A1 | 12/2014 | Wen et al. | |

(Continued)

OTHER PUBLICATIONS

Scofield, Daniel, Craig Miles, and Stephen Kuhn. "Fast model learning for the detection of malicious digital documents." Proceedings of the 7th Software Security, Protection, and Reverse Engineering/ Software Security and Protection Workshop. 2017. (Year: 2017).*

(Continued)

*Primary Examiner* — Miranda M Huang
*Assistant Examiner* — Sidney Vincent Bostwick
(74) *Attorney, Agent, or Firm* — Matthew M. Hulihan; Heslin Rothenberg Farley & Mesiti P.C.

(57) ABSTRACT

A method includes, as part of establishing a feature merging threshold ($\alpha$) for determining equivalence between two features, selecting a set of candidate $\alpha$ values, partitioning training data into a plurality of groups, establishing a model $W_\alpha$ for each $\alpha$ value of the set of candidate $\alpha$ values, iteratively performing: selecting a next group of training data of the plurality of groups of training data; adding the selected next group of training data to a training set; and for each $\alpha$ value in the set of candidate $\alpha$ values: training the $W_\alpha$ for the $\alpha$ value using the training set, and evaluating a size of $W_\alpha$, the size comprising a number of features included in the model, and choosing the feature merging threshold $\alpha$ based on the iteratively performing.

20 Claims, 11 Drawing Sheets

(56) References Cited

U.S. PATENT DOCUMENTS

| | | | |
|---|---|---|---|
| 2015/0256552 | A1 | 9/2015 | Lee et al. |
| 2015/0261955 | A1 | 9/2015 | Huang et al. |
| 2015/0281267 | A1 | 10/2015 | Danahy et al. |
| 2016/0063389 | A1 | 3/2016 | Fuchs et al. |
| 2017/0032279 | A1 | 2/2017 | Miserendino et al. |
| 2017/0091461 | A1 | 3/2017 | Tin et al. |
| 2017/0206357 | A1 | 6/2017 | Gorelik et al. |
| 2017/0223046 | A1 | 8/2017 | Singh |
| 2017/0262633 | A1 | 9/2017 | Miserendino et al. |
| 2018/0114018 | A1 | 4/2018 | Zhang |
| 2019/0163907 | A1 | 5/2019 | Scofield et al. |
| 2019/0266513 | A1* | 8/2019 | Eban ................... G06N 20/00 |
| 2019/0356553 | A1* | 11/2019 | Mermoud .......... H04L 41/5019 |
| 2020/0301405 | A1* | 9/2020 | Zhang ................ G05B 23/0221 |

OTHER PUBLICATIONS

Nissim, Nir, et al. "Alpd: Active learning framework for enhancing the detection of malicious pdf files." 2014 IEEE Joint Intelligence and Security Informatics Conference. IEEE, 2014. (Year: 2014).*

Leung, Siu Cheong. "A neural-net approach to user expertise modelling." (1996). (Year: 1996).*

Falah, Ahmed. Improving PDF Maldoc detection via data-driven feature engineering: A deep dive into malicious Portable Document Format (PDF) features, detectors and analysis methods. Diss. Deakin University, 2020. (Year: 2020).*

Vatamanu, C., et al., "A practical approach on clustering malicious PDF documents." Journal in Computer Virology 8, 4 (2012), 16 pgs.

Nissim, N., et al., "Detection of malicious PDF files and directions for enhancements: a state-of-the art survey." Computers & Security 48 (Sep. 2015), pp. 246-266.

Bazzi, A., et al., "IDS for detecting malicious nonexecutable files using dynamic analysis." 2013. In APNOMS. pp. 1-3.

Smutz, C., et al., "Malicious PDF detection using metadata and structural features." In Proceedings of the 28th Annual Computer Security Applications Conference (Dec. 2012). ACM, pp. 239-248.

Šrndić, N., et al., "Detection of malicious PDF files based on hierarchical document structure." In Proceedings of the 20th Annual Network & Distributed System Security Symposium (Apr. 2013), 16 pgs.

Pareek, H., et al., "Entropy and n-gram analysis of malicious PDF documents." Int J Eng Res Tech 2, 2 (Feb. 2013), 3 pgs.

Maiorca, D., et al., "A pattern recognition system for malicious PDF files detection." In International Workshop on Machine Learning and Data Mining in Pattern Recognition (Jul. 2012). Springer, pp. 510-524.

Laskov, P., et al., "Static detection of malicious JavaScriptbearing PDF documents." In Proceedings of the 27th Annual Computer Security Applications Conference (Dec. 2011). ACM, pp. 373-382.

Jang, J., et al., "Bitshred: feature hashing malware for scalable triage and semantic analysis." In Proceedings of the 18th ACM conference on Computer and communications security (Oct. 2011). ACM, 12 pgs.

Schneider, S., et al., "Automatic generation of string signatures for malware detection." In International Workshop on Recent Advances in Intrusion Detection (Sep. 2009). Springer, 26 pgs.

Islam, R., et al., "Classification of malware based on string and function feature selection." In Cybercrime and Trustworthy Computing Workshop (CTC), 2010 Second. IEEE, pp. 9-17.

Garfinkel, T., et al., "A Virtual Machine Introspection Based Architecture for Intrusion Detection." In NDSS (Feb. 2003), vol. 3, 16 pgs.

Engleberth, M., et al., "Detecting malicious documents with combined static and dynamic analysis" (Powerpoint Presentation). Virus Bulletin (2009), 37 pgs.

Bailey, M., et al., "Automated classification and analysis of internet malware". In International Workshop on Recent Advances in Intrusion Detection (Sep. 2007). Springer, pp. 178-197.

Anderson, R., et al., "Measuring the cost of cybercrime", The Economics of Information Security and Privacy, 2013, Springer, 31 pgs.

Chipounov, V., et al. "The S2E platform: Design, implementation, and applications", ACM Transactions on Computer Systems (TOCS) 30, 1 (Feb. 2012), 2, 49 pgs.

Cilibrasi, R., et al. "Clustering by compression", IEEE Transactions on Information Theory 51, 4 (Apr. 2005), 1523-1545.

Dinaburg, A., et al., "Ether: malware analysis via hardware virtualization extensions", Proceedings of the 15th ACM Conference on Computer and Communications Security (Oct. 2008). ACM, 51-62.

Hunt, G., et al., "Detours: Binary Interception of Win 32 Functions", 3rd Usenix Windows NT Symposium (Feb. 1999), 9 pgs.

Joint Task Force Transformation Initiative Interagency Working Group, NIST Special Publication 800-53 Revision 4—"Security and Privacy Controls for Federal Information Systems and Organizations", Technical Report. National Institute of Science and Technology (NIST) (Apr. 2013), 462 pgs.

Kondacki, S., "A concise cost analysis of Internet malware", Computers & Security 28, 7 (Feb. 2009), pp. 648-659.

Levenshtein, V., "Binary codes capable of correcting deletions, insertions and reversals", Soviet Physics Doklady, (Feb. 1966), vol. 10., pp. 707-710.

Li, Y, et al., "Feature selection based on loss-margin of nearest neighbor classification", Pattern Recognition 42, 9 (Aug. 2008), pp. 1914-1921.

Luk, C., et al., "Pin: building customized program analysis tools with dynamic instrumentation", ACM Sigplan Notices (Jun. 2005), vol. 40. ACM, 11 pgs.

Maiorca, D., "Towards adversarial malware detection: Lessons learned from PDF-based attacks", ACM Computing Surveys (CSUR) 52, 4 (Jan. 2019), 35 pgs.

Scofield, D., et al., "Fast model learning for the detection of malicious digital documents", Proceedings of the 7th Software Security, Protection, and Reverse Engineering/Software Security and Protection Workshop (Dec. 2017). ACM, 8 pgs.

Office Action in U.S. Appl. No. 15/827,211 dated Nov. 8, 2019, 24 pgs.

Notice of Allowance in U.S. Appl. No. 15/827,211 dated May 8, 2020, 9 pgs.

"Microsoft Malware Classification Challenge (BIG 2015)", retrieved on Jun. 12, 2020 from the Internet URL: <https://www.kaggle.com/c/malware-classification/data>, 1 pg.

"Two Primary Malware Feeds", Team Cymru's Malware Binary Feed, retrieved on Jul. 29, 2020 from the Internet URL: <https://web.archive.org/web/20180416194256/https://www.team-cymru.com/malware-data.html>, 5 pgs.

"ZwXxx / NtXxx Routines", retrieved on Jun. 12, 2020 from the Internet URL: <https://docs.microsoft.com/en-us/previous-versions/windows/hardware/drivers/ff567122(v=vs.85)?redirectedfrom=MSDN>, Dec. 2017, 1 pg.

"16,800 clean and 11,960 malicious files for signature testing and research", contagio, retrieved on Jun. 12, 2020 from the Internet URL: <http://contagiodump.blogspot.com/2013/03/16800-clean-and-11960-malicious-files.html>, Mar. 2013, 6 pgs.

"Python Sorted Container Types", GitHub, retrieved on Jun. 12, 2020 from the Internet URL: <https://github.com/grantjenks/python-sortedcontainers>, 4 pgs.

"NumPy v1.18.0—A new C-API for numpy.random—Basic infrastructure for linking with 64-bit BLAS and LAPACK", retrieved on Jun. 12, 2020 from the Internet URL: <https://numpy.org/>, 4 pgs.

"Lightweight, super fast C/C++ (& Python) library for sequence alignment using edit (Levenshtein) distance", retrieved on Jun. 12, 2020 from the Internet URL: <GitHub, https://github.com/Martinsos/edlib>, 7 pgs.

Pervez et al., "Feature Selection and Intrusion Classification in NSL-KDD Cup 99 Dataset Employing SVMs", 8th International Conference on Software, Knowledge, Information Management and Applications (SKIMA 2014), 6 pgs.

International Search Report and Written Opinion for PCT/US2020/059788 completed Feb. 5, 2021, 16 pgs.

Examination Report in Australian Application No. 2020424477 completed Mar. 9, 2023, 3 pgs.

(56) References Cited

OTHER PUBLICATIONS

Examination Report in Canadian Application No. 3,165,536 completed Sep. 19, 2023, 6 pgs.
Examination Report in New Zealand Application No. 790833 completed Mar. 8, 2024, 3 pgs.
Examination Report in Canadian Application No. 3,165,536 completed May 29, 2024, 5 pgs.

* cited by examiner

FEATURE EQUIVALENCE AND DOCUMENT ABNORMALITY THRESHOLD DETERMINATION

CROSS REFERENCE TO RELATED APPLICATIONS

This application claims priority to U.S. Patent Application No. 62/964,885 filed Jan. 23, 2020, entitled "AUTOMATED MODEL LEARNING FOR ACCURATE DETECTION OF MALICIOUS DIGITAL DOCUMENTS", which is hereby incorporated herein by reference in its entirety.

STATEMENT REGARDING FEDERALLY SPONSORED RESEARCH

This invention was made with government support under contracts FA8750-15-C-0017 and FA8750-18-C-0140 awarded by the Department of the Air Force. The government has certain rights in the invention.

BACKGROUND

Some modern cyber attacks are conducted by distributing digital documents that contain embedded malware. Common file formats used for malware distribution include the Portable Document Format (PDF) and the Microsoft Word format (DOC, DOCX). When an unsuspecting user opens a malicious document, the malware embedded therein executes and compromises the user's system. Since system compromise is undesirable, methodologies and tools for classifying the maliciousness of documents, i.e. as being either malicious or benign, are needed.

One approach for classifying a document is to check for anomalies in static features extracted from the document. Another approach, such as that employed by antivirus scanners, is to test the document against byte-signatures derived from previously seen malicious documents. Yet another approach works by monitoring the run-time behavior of a document viewer for unexpected actions as it renders the document. All of these approaches for malicious document detection are trained on, or seeded with, characterizations of previously encountered malicious and/or benign documents. For instance, traditional antivirus systems rely on curated databases of byte-signatures to detect malicious documents and machine learning approaches rely on models trained using features (weighted byte n-grams, dynamic execution artifacts, etc.) extracted from a corpus containing malicious and/or benign documents. This results in inefficiencies, for instance unwieldy corpus sizes and unnecessary training.

SUMMARY

Shortcomings of the prior art are overcome and additional advantages are provided through the provision of a computer-implemented method that includes: (i) as part of establishing a feature merging threshold ($\alpha$) for determining equivalence between two features, selecting a set of candidate $\alpha$ values; (ii) partitioning training data into a plurality of groups; (iii) establishing a model $W_\alpha$ for each $\alpha$ value of the set of candidate $\alpha$ values; (iv) iteratively performing: selecting a next group of training data of the plurality of groups of training data; adding the selected next group of training data to a training set; and for each $\alpha$ value in the set of candidate $\alpha$ values: training the $W_\alpha$ for the $\alpha$ value using the training set; and evaluating the size of $W_\alpha$, the size comprising a number of features included in the model; and (v) choosing the feature merging threshold $\alpha$ based on the iteratively performing.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
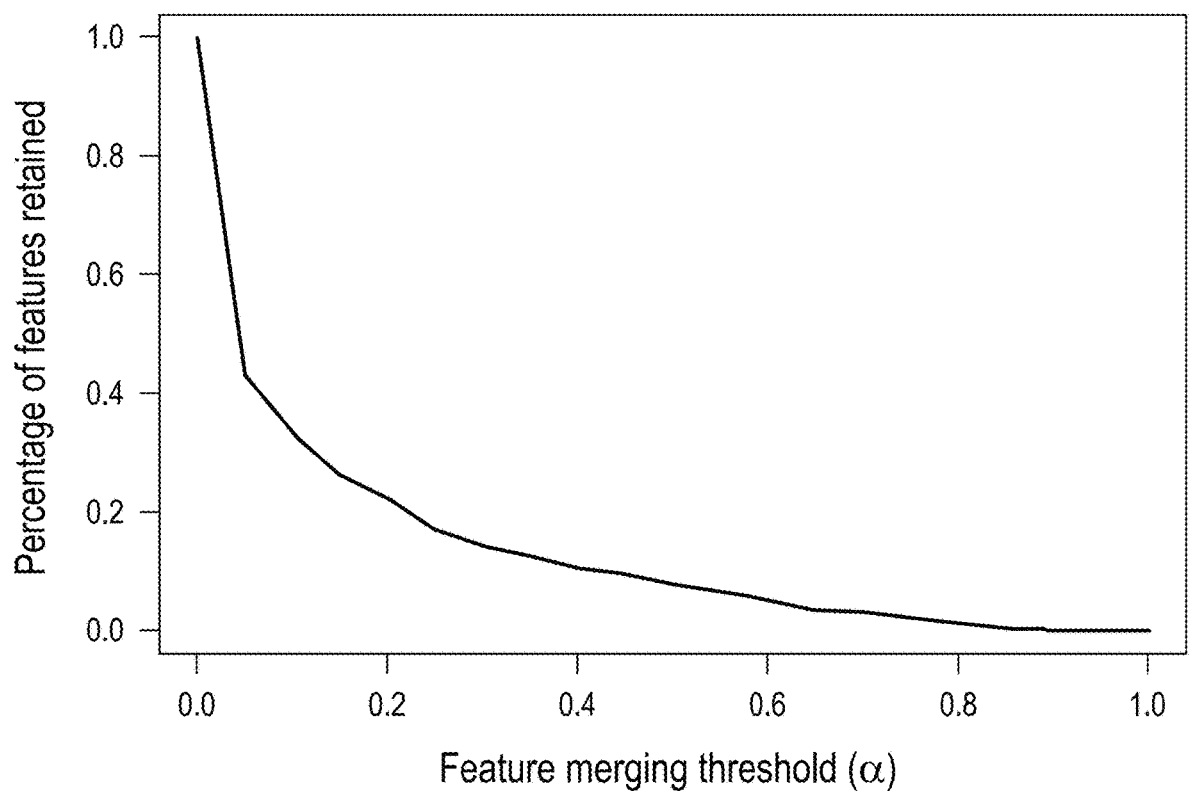
FIG. 1 depicts an effect of varying a feature merging threshold on a percentage of original features retained after feature merging via an entity resolution approach, in accordance with aspects described herein.

Described herein are methods for assessing maliciousness of a subject digital file on a computer system. Models described herein provide small, workable feature-sets providing extremely high accuracy in classifying malicious documents.

It is a common failing to assume that the size of one's corpus or feature set is of the utmost importance, as is evidenced by the gargantuan malware data sets hoarded by cyber-security researchers and analysts, the prevalence of up-to-the-minute malware feeds hawked by commercial vendors, and the many thousands of results arising from a search of technical papers for the phrase 'large corpus'. Though most researchers are aware of the law of diminishing returns and could even quantify the marginal utility of training on an extra datum if so pressed, it is nonetheless tempting to train on as much data as possible. Given this temptation, it is perhaps unsurprising that relatively little work has been done to determine just how small of a corpus or feature set one can maintain while still attaining high accuracy.

Approaches detailed herein, which include a classifier that uses features derived from dynamic analysis of an application as it processes a document in question, are capable of classifying the disposition of digital files with high accuracy (in some cases 98% or greater) even when its model is trained on just small amounts of data. The features employed correspond to the runtime interactions that the application makes with its underlying operating system (OS) while it is processing a document. Example interactions include opening a file and reading a registry key. For instance, one example feature might record that the document viewer wrote data to the file on path C: \example.txt. Concretely, a 'feature' as used herein records information about the invocation of a system call (for instance a Windows® OS system call) by the application (WINDOWS is a registered trademark of Microsoft Corporation, Redmond, Washington, U.S.A.). To keep the classification model itself small and thereby provide scalability, an entity resolution strategy is disclosed that merges syntactically disparate features that are considered semantically equivalent.

By way of specific example, the application may be a document viewer application, the digital file may be a digital document, and the processing may be the rendering/display of the document for view by a user. However, the digital file could be another type of digital file, for instance a graphics file or media (audio and/or video) file. Accordingly, the application could be another type of application, such as graphics editing/display application, media player, or any other type of application. Processing of a digital file refers to the actions the program undertakes to open, view, render, edit, play, and/or otherwise process in any other specific or general fashion, the digital file. Though in many examples described herein the application is a document viewer and the digital file is a digital document that is rendered/displayed by that program, it should be understood that these are presented merely as examples and that aspects described herein apply to other types of applications and digital files.

A classifier as described in examples presented herein is based on the aggregation of document viewer/OS interactions arising from the rendering of some benign documents into a model of features, for instance a whitelist of benign features. Thereafter, any other document that induces the document viewer to make non-whitelisted requests of a selected frequency and/or type to the OS can be deemed malicious.

A naive strategy based on this whitelisting might be unsuccessful due to the large degree of programmatic randomness present in system call arguments. For example, the document viewer might always write logging information to a temporary file with a runtime-generated random file name. Since the file paths corresponding to these file writes differ syntactically across runs, no whitelist of finite size (modulo machine limits) will be sufficient to characterize all possible future write requests.

To overcome the issue of programmatic randomness in the features, presented herein is an approach for distilling a set of features down to a minimal set of exemplars. The distillation process invokes entity resolution in which correlations are found between features that differ syntactically but represent a common semantic interaction between the document viewer and the OS. Such features are merged together into a single exemplar. This entity resolution strategy can merge features that differ due to instances of programmatic randomness, and is facilitated by way of a heuristic threshold (in some examples) for determining string similarity. One example of such similarity is "edit distance" or "string distance". A specific example of edit distance that may be used in accordance with aspects described herein is the Levenshtein edit distance. If the string representation of a feature can be transformed into the string representation of another feature using fewer than some threshold number of edit operations (as an example), then the two features are merged into one in accordance with aspects described herein.

After the exemplar whitelist is generated, classification is conducted by monitoring an application, for instance a document viewer, as it processes a digital file, for instance renders a subject document in question. The observed system call invocations are featurized as described, for instance in a same or similar manner as was used to build the distilled whitelist, and compared to the distilled whitelist. The expectation is that anomalous features arising from a malicious digital file will neither match nor merge with any of the whitelisted exemplars. If some criterion or criteria are met, for instance the number of those non-mergeable features exceeds some threshold, then the digital file may be declared to be malicious.

Accordingly, described herein are approaches for assessing maliciousness of digital files, for instance digital documents or other files of any of various formats. Reference to an 'application' that processes the digital file is a reference to an application that is configured to open and process the digital file of the given format in order to display, render, open, play, edit, or process the file in any other desired or intended manner. As noted, the application may therefore be a document viewer application to view a digital document, for instance. An example type/format of digital document is the Portable Document File (PDF) digital document of the International Organization for Standardization (ISO) 32000-1 or 32000-2 standard, and the application may be an application for opening PDF files for display on a computer interface. In other examples, the application is an application of an office suite software package and the digital document is a document of a file type native to that office suite software package. Example office suites are the Microsoft Office line of software offered by Microsoft Corporation, and the OpenOffice™ line of software offered by the Apache Software Foundation (of which OPENOFFICE is a trademark). Example file formats that may be assessed for maliciousness in accordance with aspects described herein therefore include but are not limited to *.pdf, *.ps, *.doc, *.docx, *.xls, *.xlsx, *.ppt, *.pptx, *.pub, *.vdx, *.mpp, *.one, *.odt, *.ods, *.odg, *.odp, *.odf, *.odc, as examples. Other digital files for assessment may be graphics files, for instance of the type *.jpg, *.bmp, *.png, *.eps, *.svg, and *.ai, as examples.

By way of specific example, approaches for document disposition classification are presented herein with an empirical evaluation to determine how well, in those examples, it classifies digital documents of the PDF and Microsoft Word (.docx) formats. An entity resolution strategy is presented that elides instances of programmatic randomness in a whitelist, which greatly reduces the whitelist's size while still allowing for high accuracy in digital document classification. The whitelist is constructed by monitoring the system calls invoked by an application, specifically a document viewer, as it processes, specifically as it renders, a relatively small number of benign documents. The aforementioned classification system is described in detail, then the results of an empirical evaluation thereupon are presented.

Initially described are the features for classification, a feature merging strategy based on a process of entity resolution, and a classifier. The classification approach utilizes features obtained through dynamic analysis on an application as it processes documents. Each recorded feature embeds information about the invocation of a system call by the application. Invoked system calls serve as useful features for discriminating between malicious and benign documents since user-space programs, like a document viewer, make use of system calls to interact with the underlying operating system, be it for malicious and/or benign actions.

In this example, an introspective hypervisor is used to record the system calls invoked by the document viewer. In other examples, dynamic instrumentation or a custom kernel driver may additionally or alternatively be used to record system call invocations, though these are just examples and other techniques may be used.

Recording the system calls is one aspect of the construction of the set of known benign features based on the benign digital files of the defined file type. The constructing monitors the system calls invoked by the application as it processes benign digital files of some defined file type and featurizes these, e.g. ascertains the semantic actions of the system calls and records the semantic actions as a plurality of benign features.

Table 1 below presents an example set of system calls monitored by dynamic analysis, with their corresponding semantic actions and objects.

TABLE 1

| System Call | Action | Object |
| --- | --- | --- |
| ZwCreateFile | Create | Path to file to be created |
| ZwOpenFile | Open | Path to file to be opened |
| ZwReadFile | Read | Path to file to be read |
| ZwWriteFile | Write | Path to file to be written |
| ZwCreateKey | Create | Path to registry key to be created |
| ZwOpenKey | Open | Path to registry key to be opened |
| ZwQueryKey | Query | Path to registry key to be queried |
| ZwDeleteKey | Delete | Path to registry key to be deleted |
| ZwSetValueKey | Write | Path to registry key value to be set |
| ZwDeleteValueKey | Delete | Path to registry key value to be deleted |
| ZwEnumerateValueKey | Query | Path to registry key to be enumerated |
| ZwCreateProcess | Create | Disk image name of the created process |

A new feature may be recorded each time the application process, or one of its children/child processes (e.g., since an exploit might start another process, such as cmd.exe), invokes one of the system calls shown in the first column of Table 1. That is, column 1 indicates the system calls that are of interest from a featurization standpoint, in this example. Explanations for these system calls are available from Microsoft Corporation, though more generally any system call characteristics and behavior are a function of the specific operating system involved. It is seen that ascertained semantic action associated with a system call invocation can include creation of a process or a file system operation, such as a file create, a file read, or a file write, as examples.

A feature is recorded in some examples as a k-tuple, for instance as a 3-tuple of the form image, action, object, where image is the file name of the disk image of the process that made the system call, action is the semantic action associated with the observed system call (i.e., create, open, read, write, query, or delete), and object is the name of or the path to the object upon which the specified semantic action is to be performed. Table 1 provides the semantic action and a description of the object associated with each of the identified system calls. It is noted that Table 1 is just one example of a set of system calls that may be monitored; others are possible.

Some examples of recorded features, plus explanations, are shown in Table 2:

TABLE 2

| # | Recorded Feature | Explanation |
| --- | --- | --- |
| 1 | reader.exe, write, C:\temp\2f358b.log | Denotes that reader.exe process attempted to write a file on the specified path. |
| 2 | reader.exe, read, C:\docs\file.pdf | Denotes that reader.exe process attempted to read a file on the specified path. |
| 3 | reader.exe, write, C:\temp\a632cf.log | Denotes that reader.exe process attempted to write a file on the specified path. |
| 4 | reader.exe, create, browser.exe | Denotes that reader.exe process spawned a child from the browser.exe disk image. |

While system calls discussed herein by way of example are of a finite set, covering only some file system, registry, and process related behaviors, a significant portion of behaviors (e.g. networking) are handled by the kernel as combinations of these simpler behaviors and are therefore captured as well.

The features obtained using the methodology above in monitoring an application as it processes digital files evince a great deal of runtime generated randomness. In particular, the file paths and names encoded in the features' object fields often contain substrings of obviously random characters. For example, the file names embedded in the object fields of example features #1 and #3 in Table 2 above appear to be of the form {6 random hexadecimal characters}.log. Though those two features appear to be semantically equivalent in the sense that they both reflect the writing to a log file by the application, they differ syntactically.

This prevalence of runtime-generated randomness precludes the creation of a comprehensive whitelist of such features that characterizes the class of benign digital files. Rather, an entity resolution procedure is used that elides instances of programmatic randomness in the collected features, and thereby provides a means to recognize that two such features are semantically equivalent even if they are syntactically disparate. Entity resolution as used herein is a generic term to say that two items are "equivalent" to each other.

To this end, aspects described herein employ a heuristic entity resolution technique to merge semantically equivalent yet syntactically disparate features into a single exemplar feature, for instance based on Levenshtein edit distance as seen from examples herein. This entity resolution is applied against the several benign features to merge, into a single benign feature, at least two benign features that differ syntactically but represent a common semantic interaction between the application and the operating system. This merging determines whether a string representation of one benign feature is similar to a string representation of another benign feature, and merges the two based on determining their string representations are similar. Determining similarity includes, in some examples, determining whether the string representation of the one benign feature can be transformed into the string representation of the other benign feature using fewer than some threshold number of edit operations.

Specifically, the set of such exemplar features extracted from a sufficiently representative corpus of benign digital files is interpreted as including a comprehensive exemplar whitelist characterizing the class of benign digital files. Any two features, a and b, can be defined to be $\alpha$-equivalent if $$\frac{Lev(a, b)}{n} < \alpha,$$

where Lev(a,b) denotes the Levenshtein edit distance between features a and b, and n is the string length of the longer feature. Then, letting C be a set of features obtained from the dynamic analysis on the rendering of a corpus of benign digital files, $W_\alpha$ is deemed an exemplar whitelist for C if and only if $$\forall c \in C, \exists w \in W_\alpha : c \text{ is } \alpha\text{—equivalent to } w.$$

As an example, assume that the features shown in Table 2 arose from the dynamic analysis of a benign PDF document. Also assume $\alpha=0.2$. The edit distance between the first and second example features is 16, the length of the longer of the two is 35, and 16/35 ≮0.2. Thus, those two features are not $\alpha$-equivalent and are not merged, in this example. Conversely, the edit distance between the first and third example features is 5, they both have the same length of 35, and 5/35<0.2. Thus, those two features are $\alpha$-equivalent and are merged, in this example. It turns out the first and the third features are the only pair among the example features in Table 2 that are $\alpha$-equivalent. As such, the whitelist corresponding to this initial set of example features contains the second feature, the fourth feature, and either the first or the third feature (the other having been merged).

Naively, one can find a subset of C that meets this definition by starting with an empty whitelist, $W_\alpha$, and iterating over every feature, c ∈ C. At each step, check c for $\alpha$-equivalence with everything in $W_\alpha$ and add c to $W_\alpha$ only if $\exists w \in W_\alpha$ such that c is $\alpha$-equivalent to w. However, this naive strategy tends to be slow since each successive feature is compared to progressively more features as $W_\alpha$ grows, leading to an asymptotic worst case bound of $O(|C|^2 L)$ where L is the worst-case cost of calculating Levenshtein edit distance (i.e., the length of the longest c ∈ C squared).

Since the naive approach for constructing an exemplar whitelist does not scale, a more efficient strategy is used. Empirically, features that are semantically equivalent tend to be lexicographically close to one another (i.e. they tend to have long coinciding prefixes). This observation informs a revised strategy that provides for a significant reduction in the number of required comparisons when constructing $W_\alpha$. The revised strategy is nearly equivalent to the aforementioned strategy except that rather than comparing each successive c ∈ C to the entirety of the current whitelist, instead c is tested for $\alpha$-equivalence against just the two features in $W_\alpha$ that immediately precede or succeed it lexicographically. This revised strategy has worst case complexity of just $O(|C|L)$.

To show that the revised strategy for exemplar whitelist generation still provides for strong entity resolution as compared to the exhaustive approach, 2,000 exemplar whitelists were constructed, for $\alpha=0.05$ and $\alpha=0.35$, from 2,000 pairs of PDF documents. While doing so, the amount of feature merging that occurred in terms of the number of features that 1) merged with just their lexicographic neighbor(s), 2) merged with just one or more non-neighbors, 3) merged with both a neighbor and a non-neighbor, or 4) did not merge with any other features, were recorded. The results, showing the averaged amount of merging across the 2,000 experiments, are shown in Table 3:

TABLE 3

| % of features merging with | $\alpha = .05$ | $\alpha = .35$ |
|---|---|---|
| No other feature | 0.06 | 0.06 |
| Only neighboring features | 0.05 | 0.04 |
| Only non-neighboring features | 0.14 | 0.12 |
| Neighboring and non-neighboring features | 99.7 | 99.8 |

The results show that on average just 0.06% of features merge with one or more non-neighbors but not with either neighbor. This indicates that testing just lexicographically-neighboring features for $\alpha$-equivalence provides a strong approximation to the exhaustive method.

Benign versus malicious classification is implemented with a heuristic rule-based classifier. A digital file may be classified as malicious when the number, k, of non-mergeable features observed as the application processes the digital file exceeds a threshold, $\beta$. Given a feature merging threshold, $\alpha$, this k for a suspect digital document is determined as follows, as one example:

Let $W_\alpha$ be the exemplar whitelist generated via the method above on a corpus of benign documents for some particular pre-selected a, and let S be the set of features collected from rendering the suspect document under the dynamic analysis. For any feature s ∈ S, let $p_s$ and $n_s$ respectively represent the two exemplar features that lexicographically precede and succeed s in $W_\alpha$. Further, let F: S→{0, 1} be defined as $$F(s) = \begin{cases} 1 & \text{if } s \text{ is } \alpha - \text{equivalent to } p_s \text{ or } n_s, \text{ or} \\ 0 & \text{otherwise} \end{cases}$$

Then $$k = |\{s \in S \setminus W_\alpha | F(s) \neq 0\}|$$

The document in question is declared malicious if k>$\beta$. Thus, based on the identified number of features that do not correlate to the benign features of the whitelist being above a threshold number, the digital file is determined to be malicious.

In some examples, there may be additional factors to determining maliciousness of the digital file. For instance, the type/action of a feature may be a consideration (with some features being seen as more suspect than other features, and/or there may be multiple thresholds established, with each such threshold corresponding to a type or class of feature, and maliciousness being determined based on whether some number of such thresholds is exceeded Continuing with the example from above and letting $\beta=1$, assume that a new document of unknown disposition is to be classified. Further, assume that the features arising from the dynamic analysis of the application as it renders that document are those shown in Table 4 below. Of these new features, feature A merges with a feature already in the whitelist (either #1 or #3 from Table 2). However, neither of the other two new features merge with nor match any features in the exemplar whitelist, thus k=2 and k>$\beta$, and hence the new document is classified as malicious.

TABLE 4

| # | Recorded Feature |
|---|---|
| A | reader.exe, write, C:\temp\9467f2.log |
| B | reader.exe, write, C:\downloads\payload.exe |
| B | reader.exe, create, payload.exe |

Evaluation of this approach was conducted by classifying the disposition of PDF documents by monitoring their renderings under the Adobe® Reader v9.04 document viewer (offered by Adobe Inc., San Jose, California, USA, of which ADOBE is a registered trademark). This particular version of Adobe Reader was selected for use since it is known to be susceptible to several publicly disclosed exploits.

An open-source dataset of both benign and malicious PDF documents was used to conduct the evaluation. From this dataset, 311 of the benign PDFs were used for training, and another 33 benign PDFs plus 33 malicious PDFs were used for testing. The training set size was chosen arbitrarily and the results show that it was more than sufficient. The size of the malicious test set was determined by the number of malicious documents inside of the dataset that are known to target Adobe Reader v9.0. These malicious PDFs include 5 examples of the CVE-2010-2883 exploit, 15 examples of the CVE-2010-0188 exploit, and 13 examples of the CVE-2011-2462 exploit.

By way of specific example, a model for Adobe Reader was obtained by training on the corpus of benign PDFs as described herein. While featurizing the PDFs of the benign corpus, it was observed that opening a benign PDF for rendering results in 956 features (on average) being recorded, and after term merging with $\alpha=0.05$, what remained was a trained whitelist model for PDFs containing 1,247 exemplar features. These exemplar features included the following:

acrord32.exe, write,c:/documents and settings/user/local settings/application data/adobe/updater6/aumlib.log
acrord32.exe,read,c:/program files/adobe/reader9.0/resource/font/minionproit.otf
acrord32.exe,read,c:/program files/adobe/reader9.0/resource/font/courierstd-oblique.otf which reflect example actions Adobe Reader normally performs when it opens and renders a benign PDF.

A particular PDF document under consideration is known to exploit the CVE-2010-28835 buffer overflow vulnerability in Adobe Reader v9.0 to trigger execution of a malware payload. To automatically classify the disposition of this suspect PDF document, a dynamic tracing feature collector was used to collect the system call trace features that the document induced in Adobe Reader, and the entity resolution technique described herein was used to identify how many of those features merge with those in the benign PDF model. It was observed that opening the malicious PDF resulted in 1,501 features being recorded, of which 929 did not merge with any features in the benign model (i.e., the recorded trace contained 929 anomalous features). Conversely, experience (see below) tells us that opening a previously unseen benign PDF results in a trace that contains on average just five non-mergeable features—and since 929 is so much greater than 5 (such as above some configurable threshold), it can be reasonably concluded that this PDF is indeed malicious.

By inspecting the features recorded in the trace resulting from opening the suspect document, the anomalous behavior that resulted in this classification decision can also be readily observed. In particular, from reverse engineering the PDF document in question, it is known that malformed data in an embedded TTF font induces a buffer overflow in Adobe Reader that leads to execution of an embedded malicious payload. The embedded payload is a dropper that drops a JavaScript payload to disk and then uses cmd.exe to run the JavaScript payload under the Windows Script Host csript.exe. The JavaScript in turn drops a portable executable (PE32 executable).exe payload to disk and then runs that payload. Finally, the .exe payload opens a persistent backdoor on the infected system. By looking at the PDF's non-merging features, examples of which are shown below in Table 5, this scenario is observed. Because these actions undertaken by both Adobe Reader and the child processes spawned by the exploit payload beneath it were so different from the actions normally taken by Adobe Reader when working with benign files, the classification strategy confidently deemed the file malicious.

TABLE 5

| Recorded Feature |
|---|
| acrord32.exe, writes,c:/docume 1/user/locals 1/temp/winword.js |
| acrord32.exe,creates, cmd.exe/operatingSystem-cmd.exe-1240 |
| cmd.exe, creates, cscript.exe/operatingSystem-cscript.exe-1272 |
| cscript.exe,reads,c:/docume 1/user/locals 1/temp/winword.js |
| cscript.exe, writes,c:/docume 1/user/locals 1/temp/ temqp.tmp |
| cscript.exe, creates, temqp.tmp/temqp.tmp-1412 |
| temqp.tmp,writes,c:/docume 1/user/locals 1/temp/conime.exe |
| temqp.tmp, creates, conime.exe/operatingSystem-conime.exe-1452 |

As the feature merging threshold $\alpha$ increases, so too does the percentage of features that are merged together. FIG. 1 depicts the effect of varying a in terms of the percentage of original features retained after feature merging via entity resolution, in accordance with aspects described herein. Note that at even relatively low a of, say, 0.05, a reduction of more than half is observed. In other words, over half of the features obtained by monitoring Adobe Reader v9.0 while it renders benign documents only vary due to small amounts of programmatic randomness. Further, as will be seen below, accuracy as high as 90% can even be attained using $\alpha$ up to 0.35, which provides a feature set size reduction of 85% in this example.

Figure 2:
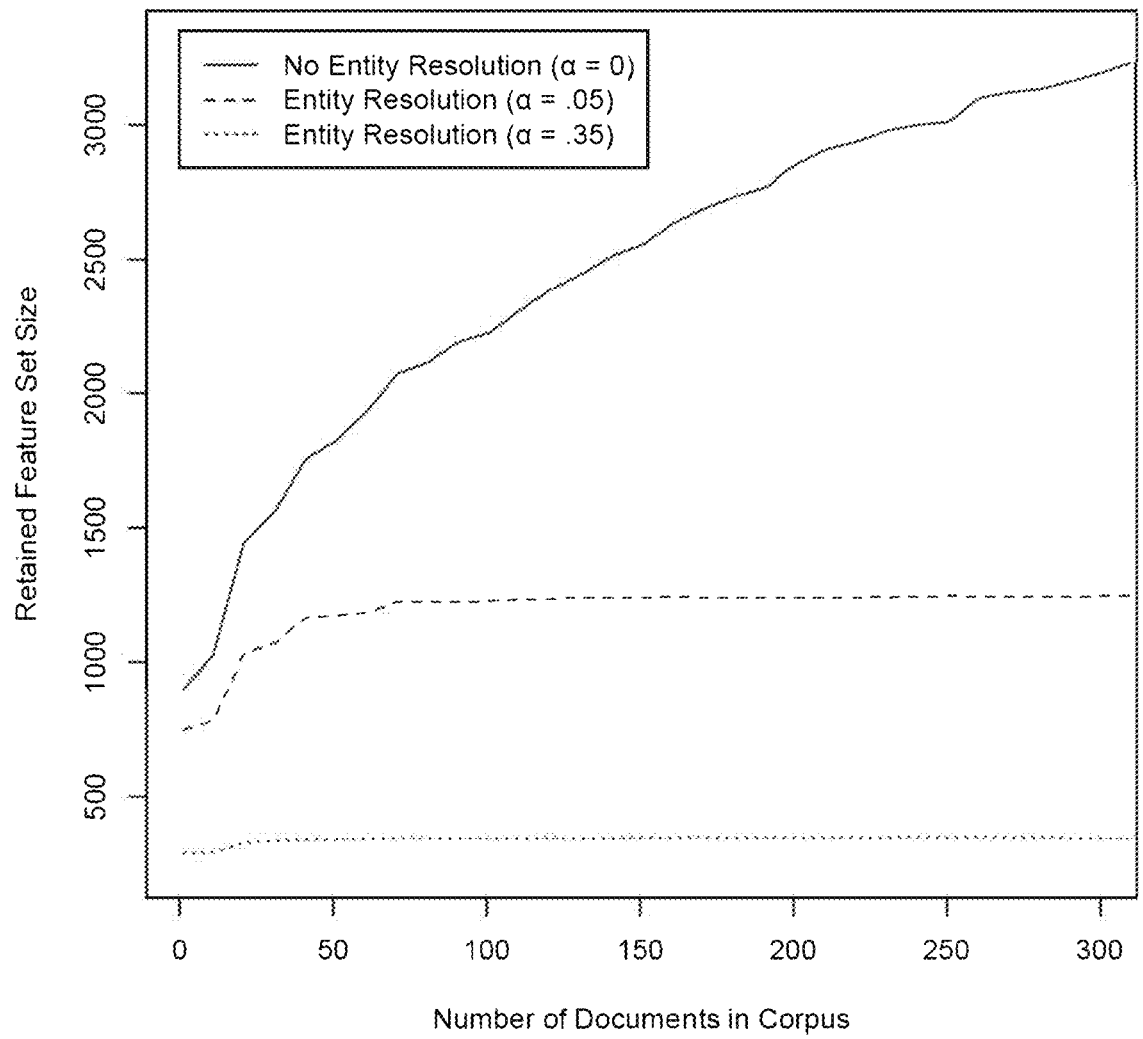
FIG. 2 illustrates a growth rate of a feature whitelist with and without entity resolution-based feature merging as a number of rendered documents is varied, in accordance with aspects described herein.

FIG. 2 illustrates the growth rate of the feature whitelist with and without entity resolution-based feature merging as the number of rendered documents is varied. With no feature merging (i.e., $\alpha=0$), the size of the whitelist has linear growth (monotonically increases) proportional to the number of documents rendered. In contrast, feature merging appears to provide an upper bound on the size of the whitelist irrespective of the number of documents rendered. For instance, with $\alpha=0.05$, the size of the whitelist tops out at 1,247 exemplar features, and with $\alpha=0.35$, it tops out at 345 exemplar features.

With respect to the quickness with which the upper bound on the whitelist's size is reached, at $\alpha=0.05$, rendering just 60 documents is sufficient to obtain 95% of the whitelist that is obtained by analyzing the entire training set of 311 documents, and at $\alpha=0.35$, just 20 benign documents are necessary to obtain 95% of the whitelist constructed using the entire training corpus. This shows that the vast majority of viewer/OS interactions differ only slightly due to runtime variations, and thus a small corpus of, for instance, no more than 100 benign documents is more than sufficient to build a comprehensive whitelist of exemplar features.

Classification accuracy is defined:

$$\frac{TP + TN}{P + N}$$

where TP and TN are, respectively, the count of true positive and of true negative classifications, and P and N are, respectively, the count of malicious and of benign documents in the testing set.

Figure 3:
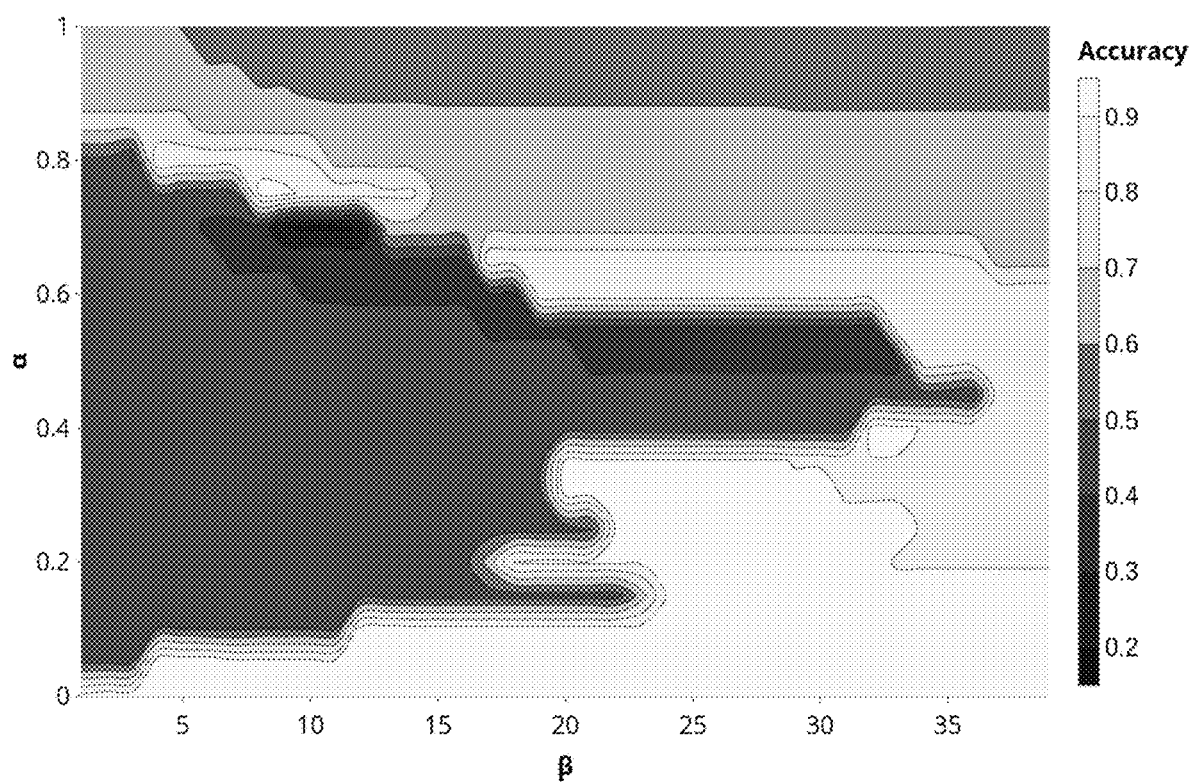
FIG. 3 depicts an example contour map showing classification accuracy attained as a feature merging threshold and anomalous feature threshold are varied, in accordance with aspects described herein.

FIG. 3 depicts a contour map of classification accuracy attained as $\alpha$ and $\beta$ are varied. The contour map shows that nearly perfect classification accuracy (>98% with precision 1.0 and recall 0.97) is attained with $\alpha=0.05$ and $\beta=5$. High accuracy (>90% with precision 1.0 and recall 0.85) is attained even with more significant feature merging, for instance with $\alpha=0.35$ and $\beta=25$ (and at many other points as well). Consequently, an analyst can perform nearly perfect classifications using a whitelist containing just 1,247 exemplar features and with minimal trade-off can use a significantly smaller whitelist containing just 347 exemplar features. In other words, a model built using only a relatively small (1,247) set of exemplar features is sufficient to classify the disposition of PDF documents with near perfect accuracy, while an even smaller (347) set of exemplar features is enough to attain better than 90% accuracy. Conventional approaches would typically involve millions of exemplar features. Further, the number of benign PDFs that were needed to learn the classification model described was itself very small—as few as 20 benign PDFs were sufficient to build the model that accurately characterizes the class of all benign PDFs.

As another evaluation, a classification experiment like the one above was performed for the Microsoft Word program offered by Microsoft Corporation. The experiment monitored Microsoft Word 2010 as it rendered benign training, benign test, and malicious test DOCX (*.docx) files. Then aspects described herein were utilized to perform classification. Overall, the results were on par with those discussed above with respect to PDFs.

Figure 4:
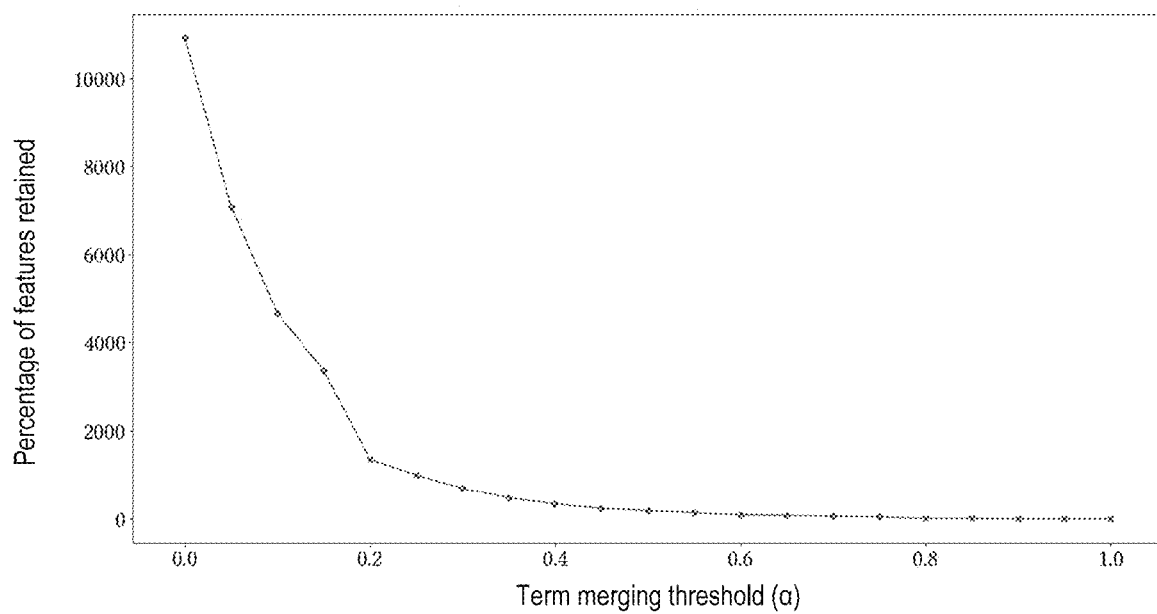
FIG. 4 depicts an effect of varying a term merging threshold on a percentage of original features retained after term merging via an entity resolution approach, in accordance with aspects described herein.

FIG. 4 shows the percentage of original features derived from the benign training set that are retained after feature merging for various $\alpha$. As is the case with Adobe PDF, a small a (in this case 0.10) results in a feature set reduction of more than half for Microsoft Word documents. Consistent with the above results, an increase in a does not significantly impact the classification results. Accuracy exceeding 90% can again be attained using $\alpha$ up to 0.35, which in this case provides a feature set size reduction of over 95%.

Figure 5:
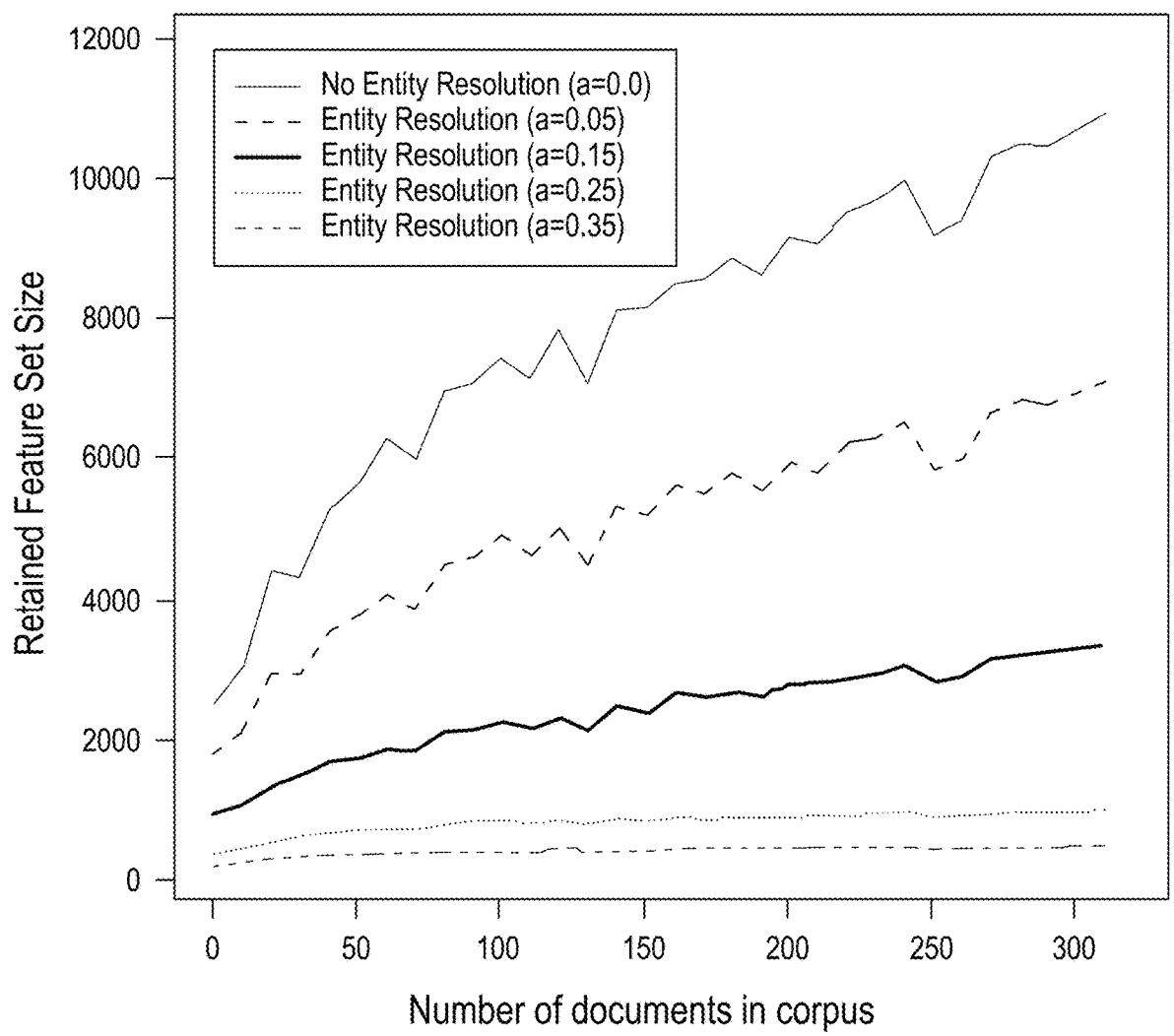
FIG. 5 illustrates another growth rate of a feature whitelist with and without entity resolution-based feature merging as a number of rendered documents is varied, in accordance with aspects described herein.

FIG. 5 illustrates the growth of the Microsoft Word whitelist with and without feature merging as the number of rendered documents is varied. With no feature merging (i.e., $\alpha=0$), the size of the whitelist has linear growth proportional to the number of documents rendered. In contrast, feature merging with increasing a appears to reduce the effect of growth and eventually (for $\alpha \geq 0.25$) provides an upper bound on the size of the whitelist irrespective of the number of documents rendered. For instance, with $\alpha=0.25$, the size of the whitelist tops out at 990 exemplar features, and with $\alpha=0.35$ it tops out at 480 exemplar features.

The minimum convergence threshold for Microsoft Word of $\alpha=0.25$ was significantly higher than the $\alpha=0.05$ observed for Adobe Reader. An early investigation of this led to an intuitive explanation based upon the average feature lengths of the two applications. The features are generally a composition of a registry key path or file path plus a random string. Adobe Reader produces features that are on average 83 characters long and uses short 4 character long randomized file names. In contrast, Microsoft Word tends to use deeper registry keys and file paths, and longer random strings; the result being features that are on average 152 characters long with the random portions being of length 32. These numbers $$\left(\frac{4}{83} \approx 0.053 \text{ and } \frac{32}{152} \approx 0.197\right)$$

very closely match the $\alpha=0.05$ and $\alpha=0.25$ thresholds derived empirically for the two applications.

It was observed that Word document classification accuracy varies with $\alpha$ and $\beta$. Specifically, nearly perfect classification accuracy (>96%) was attained with $\alpha=0.05$ and $\beta=34$, and good accuracy (>90%) was attained with $\alpha=0.35$ and $\beta=30$. This means that an analyst or other entity, such as an unattended, executing software process, can perform nearly perfect classifications using $\alpha$ whitelist containing about 7,000 exemplar features, and with minimal trade-off can even use a significantly smaller whitelist containing just 980 exemplar features.

The results of these evaluations indicate that a classifier using features derived from the system calls that an application (e.g. document viewer) makes as it processes digital files (e.g. renders documents) can attain near perfect accuracy while performing fast and relying on a significantly reduced feature set as compared with other approaches. The benign classes of DOCX and PDF documents in the examples above can be characterized by a very small set of viewer/OS interactions that are induced by those documents' collective rendering. Further, these interactions can be learned by monitoring the rendering of just a small number of documents, i.e. a small dataset is sufficient.

In some embodiments, selection of satisfactory model parameters (such as $\alpha$ and $\beta$) that maximize classification accuracy is performed by an administrator or other user. As an alternative, optimal or desired model parameter selection, for instance to establish a threshold ($\alpha$) for determining equivalence between two features and a related document abnormality threshold ($\beta$), may be performed automatically according to aspects described herein. This can expedite the model learning process.

In aspects described elsewhere herein, hand-picked $\alpha$ and $\beta$ values were used that provided the best accuracy as determined from the results of the PDF and Microsoft Word classification evaluations. However, to fully automate the construction of a suitable classifier (for an arbitrary document viewer, as just one example), a method can automatically select satisfactory values of $\alpha$ and $\beta$.

The selection of an $\alpha$-threshold has at least two effects on the system. First, a good $\alpha$-threshold can reduce the size of the model since, with merging, it is necessary to keep only a single entry for each set of similar observed viewer/OS interactions (rather than one entry for each individual interaction). Second, and equally important, the accuracy of detections is directly impacted by the selection of $\alpha$; an $\alpha$-threshold that is too high can spuriously cause anomalous interactions to be merged into benign behaviors and thereby lead to false negatives, while an $\alpha$-threshold that is too low can lead to false positives because the system will flag as anomalous any benign semantically-equivalent interactions (e.g., logs written to randomly named log files) that only differ syntactically in a few positions.

The other model parameter, β, also has a direct impact on the accuracy of detections. To determine whether a suspect document is malicious or benign, the interactions it induces between the document viewer and the OS are observed. Each such interaction is compared to those in the model (using the α-threshold comparison strategy discussed above), and any observed interaction that cannot merge with α term in the model (due to its apparent dissimilarity with all the model's terms) is deemed anomalous. If the number of observed anomalous system interactions induced by rendering the suspect document within its viewer exceeds the model parameter β, then the classifier deems the suspect malicious; otherwise, it is deemed benign. Since β therefore controls how many anomalous interactions are needed to be observed before deeming a document malicious, it follows that too low a β will lead to many (e.g. an undesired number of) false positives, while too high a β will lead to many (e.g. an undesired number of) false negatives. More subtly, since the number of anomalies depends on how lenient the term merging is, the appropriate choice of β also depends on one's prior choice for α. A low value of α can lead to a higher number of anomalies, and hence necessitate a higher value for β to maintain classification accuracy.

The choices of both α and β can have a significant impact on the ultimate detection accuracy of the classifier, and therefore α and β selection is to be taken seriously. FIG. 3 demonstrates an example of the wide range of detection accuracy achievable by the classifier for Adobe PDFs documents. Some regions reflect high accuracy where appropriate values of α and β parameters were chosen, while some regions reflect poor accuracy, occurring when the parameter pair selections are not appropriate for the document viewer. Careful selection of a pair of α and β parameters can be important, since even slight variations in them can lead either to detections approaching 100% accuracy or to poor performance approaching 0% accuracy.

If an appropriate α parameter is selected, term merging leads to concise models that combine features that varied only due to programmatic randomness. This means that any terms still deemed anomalous after term merging are likely to be true anomalies rather than just random permutations of common benign system interactions. The optimal value for α can thus be thought of as the minimum value that allows semantically equivalent features to be merged together. Before describing a mechanism by which to choose such an α, it is first described how programmatic randomness affects edit distance.

Assume there are two features f and v, both of length n, that differ due to randomness. Assume that this randomness exists in substrings of length $\ell$ in both f and v. Further, assume that both of these substrings are generated by a random process that uniformly samples an alphabet $Z$ of size z, and that the $\ell$-length substrings begin at the same offset o in both f and v. This formalism describes the programmatic randomness shown in the example above, and all of the other programmatic randomness encountered so far.

Given this formulation, for integers i such that $o \leq i < o + \ell$, and $\forall x \in Z$, it is seen that $$Pr(f_i = x | v_i = x) = Pr(f_i = x) = \frac{1}{z}.$$

As such, if $\mathbb{X}$ is a random variable describing the number of matching characters in the random substrings of f and v, then $\mathbb{X}$ has a Binomial distribution with $\ell$ trials and a success probability of 1/z. Conversely, the number of characters expected to vary between f and v (i.e., the number of character substitutions necessary to transform f to v or the Levenshtein distance between f and v) is the random variable $\mathbb{L} = \ell - \mathbb{X}$.

Given the definition of α-equivalence above, it is known that f and v will be deemed α-equivalent if and only if $$\frac{\mathbb{L}}{n} < \alpha.$$

Thus, in expectation we expect f and v to be $\hat{\alpha}$-equivalent for any $\hat{\alpha}$ such that $$\frac{E(\mathbb{L})}{n} < \hat{\alpha}.$$

Using the linearity of expectation to rewrite this inequality, $E(\mathbb{L}) = E(\ell) - E(\mathbb{X})$, which can be simplified as $$\ell - \frac{1}{z}, \text{ or } \ell \times \frac{z-1}{z}.$$

So, we expect f and v to be $\hat{\alpha}$-equivalent for all $$\hat{\alpha} > \frac{\ell}{n} \times \frac{z-1}{z}.$$

If one knows that programmatic randomness occurs in this manner, and knows a-priori the appropriate values of $\ell$, n, and z, then the above derivation can be used to compute a feasible α analytically.

Alternatively, an algorithm is described below by which an approximately optimal value of α can be recovered. An approach for establishing the feature merging threshold α includes selecting a set S of candidate α values and partitioning the training data into several (two or more) groups. Next, for each candidate α ∈ S, a respective model $W_\alpha$ (for instance a whitelist of features) is established (initially empty, in some examples) and iteratively trained, which adds benign features thereto. That is, multiple iterations are performed wherein each $W_\alpha$ is trained/re-trained by incorporating an additional group of training data in each round. After each round, the size of (e.g. number of features included in) each model, $|W_\alpha|$, is evaluated. Thus, a process can iteratively perform (i) selecting a next group of training data of groups of training data and adding the selected next group of training data to a training set, then (ii) for each α value in the set of candidate α values, training the respective $W_\alpha$ for the α value using the training set and evaluating the size of $W_\alpha$, e.g. a number of features included in the model. The iterations terminate when either every $W_\alpha$ has converged (i.e., incorporation of additional training data does not increase $|W_\alpha|$), or the training data has been exhausted (i.e. each of the group of training data of the plurality of groups of the training data has been added to the training set and used to train the models). After termination of this iterating, the set of α values from S for which $W_\alpha$ was observed to converge are returned as feasible α values to use as the threshold for determining equivalence between two features. If no such model converges, this can indicate that additional training data is desired for additional training.

This α candidate selection algorithm was used to evaluate experimental data and was found to be extremely effective. Take as a concrete example the trace data collected from Microsoft Word while processing documents as discussed above. By manually inspecting this data, it is discovered that Microsoft Word frequently incorporates random Unique Universal Identifiers (UUIDs) into the registry keys to which it writes, with each UUID consisting of thirty-two random hexadecimal characters. Using the above model, this corresponds to $\ell=32$ and $z=16$. Additionally, the average feature length of observed Microsoft Word trace items gives $n=152$. Using the analytical result above, it is expected that for $\hat{\alpha}>0.197$ (where $$0.197 = \frac{32}{152} \times \frac{16-1}{16}\Bigg),$$

features that differ only due to programmatic randomness would be $\hat{\alpha}$-equivalent. As such, we would expect models with $\alpha>0.197$ to converge and those with $\alpha<0.0197$ to continue growing as additional documents are added. Looking at FIG. 5, it is seen that this result plays out empirically with $\alpha=0.25$ being the first value on the chart for which the model size converges. It is noted that in that experiment, the value $\alpha=0.20$ was not tested as candidate α (and hence it is not displayed in this chart), however it was verified that the model converges with $\alpha=0.20$.

Given a set of feasible values for a, another step computes corresponding optimal values of β for each feasible candidate α. β is a 'document abnormality' threshold, and in the context of feature-based malicious document classification this represents a malice threshold, since a feature that does not merge with α benign feature may be considered potentially, or actually, malicious. To compute optimal values of 8, using the malicious document classification example, a collection of benign documents is first partitioned into three sets: two training sets and a validation set. Then, for each feasible candidate α, a corresponding model (e.g. a whitelist of benign features) $W_\alpha$ for that feasible candidate α is learned from the first training set. Next, every document d in the second training set is evaluated against each $W_\alpha$. By 'evaluated' it is meant that the number of anomalies $k_d$ resulting from the rendering of each document is observed. For each feasible candidate α, there is a respective whitelist $W_\alpha$, and the evaluating evaluates each of the d number of documents in the second training set against each such whitelist. There are d number of values of $k_d$ for each whitelist. A satisfactory value of β for some $\alpha \in S$, dubbed $\beta_\alpha$, is chosen to be the maximum $k_d$. That is, for any given alpha, there is a collection of d number of '$k_d$'s, and the maximum $k_d$ from that collection informs the β for that given alpha. This method minimizes the false positive rate of the classifier over the training data. More specifically, any threshold less than $\beta_\alpha$ would result in a higher false positive rate and any value greater than $\beta_\alpha$ would have an equivalent false positive rate, but also potentially admit more false negatives. Though in this example false positives were minimized, other objective/fitness functions can be optimized (for instance minimized or maximized, as examples) here too or instead if desired.

At this point, the parameter selection algorithm has constructed a set of classifiers with associated tuples (α, $\beta_\alpha$, $W_\alpha$). Then, as part of the parameter learning algorithm, an optimal classifier is chosen from that set of feasible classifiers. To do so, the validation set described above is used to examine the false positive rate of each classifier, and the one with the lowest false positive rate is selected. If a tie exists, preference may be given to the classifier with the lowest associated a. This parameter selection approach was evaluated empirically using Microsoft Word and Adobe PDF document datasets. For both file formats, it was observed that these automatic parameter selection techniques recovered parameter choices that provided accuracy within epsilon of those that has been previously selected by hand. In other words, with these algorithmic techniques for optimally selecting α and β in place, quick and automatic construction of highly accurate malicious digital document detection models for arbitrary document viewers using just small amounts of benign training data is provided.

Implementing approaches described herein includes, in some examples, use of software component(s) that include: a dynamic analyzer, a model learning tool, and a classifier. The dynamic analyzer can perform system call monitoring for example by hooking the SYSENTER/SYSEXIT instructions of the x86 instruction set architecture offered by Intel Corporation, and decoding the system call arguments. Given a digital document, the component produces, e.g., a comma-separated trace output. By way of just one specific example, the dynamic analyzer may be implemented as a plugin for the Selective Symbolic Execution platform described in Vitaly Chipounov, Volodymyr Kuznetsov, and George Candea. 2012. The S2E platform: Design, implementation, and applications. ACM Transactions on Computer Systems (TOCS) 30, 1 (2012), 2.

The model learning tool can implement methods described herein with respect to model parameter selection. The tool can consume a set of benign traces and produce a tuple (α, $\beta_\alpha$, $W_\alpha$) corresponding to the term-merging parameter, classification threshold, and whitelist, respectively. The core algorithms can be implemented in, e.g., Python, and data structures from the publicly-available sorted containers and numpy libraries. An implementation of Levenshtein edit distance may be borrowed from the publicly-available edlib package.

The classifier can consume the comma-separated trace output for a suspect document and a tuple (α, $\beta_\alpha$, $W_\alpha$), and produce a conviction decision (i.e., malicious or benign). In some examples, this component is written in Python and shares many common data structures with the model learning tool. As such, common libraries (i.e., edlib, sorted containers, and numpy) can be used in both tools.

Some aspects described herein detect malicious digital files by monitoring the application process for malicious activity. This is in contrast to other approaches that have generally sought to statically detect anomalies in documents. Such static detection can be evaded by attackers via the application of obfuscations to their malicious documents. In contrast, methods set forth herein observe malicious interactions that a malicious digital file induces an application to take, irrespective of any applied obfuscations. Aspects differ from other approaches also in that a more manageable-sized whitelist of system call based features is used to characterize the set of benign digital files, rather than a significantly larger dataset that results in slower, less efficient classification with no better accuracy.

Accordingly, a classifier for the disposition of digital files is shown that trains on only a relatively small dataset of benign digital files and retains only a relatively small set of exemplar features. This small-data classifier attains accuracy the same or similar as big-data approaches. In particular, an approach described herein was shown to attain 98% accuracy in classifying PDFs as either malicious or benign. Further, the classification approach described herein entails so few comparisons that it can easily be performed in an online fashion. As such, the proposed strategy is suitable for use in conjunction with any sandboxing or detonation-chamber-based technologies that provide for the tracing of system calls.

Figure 6A:
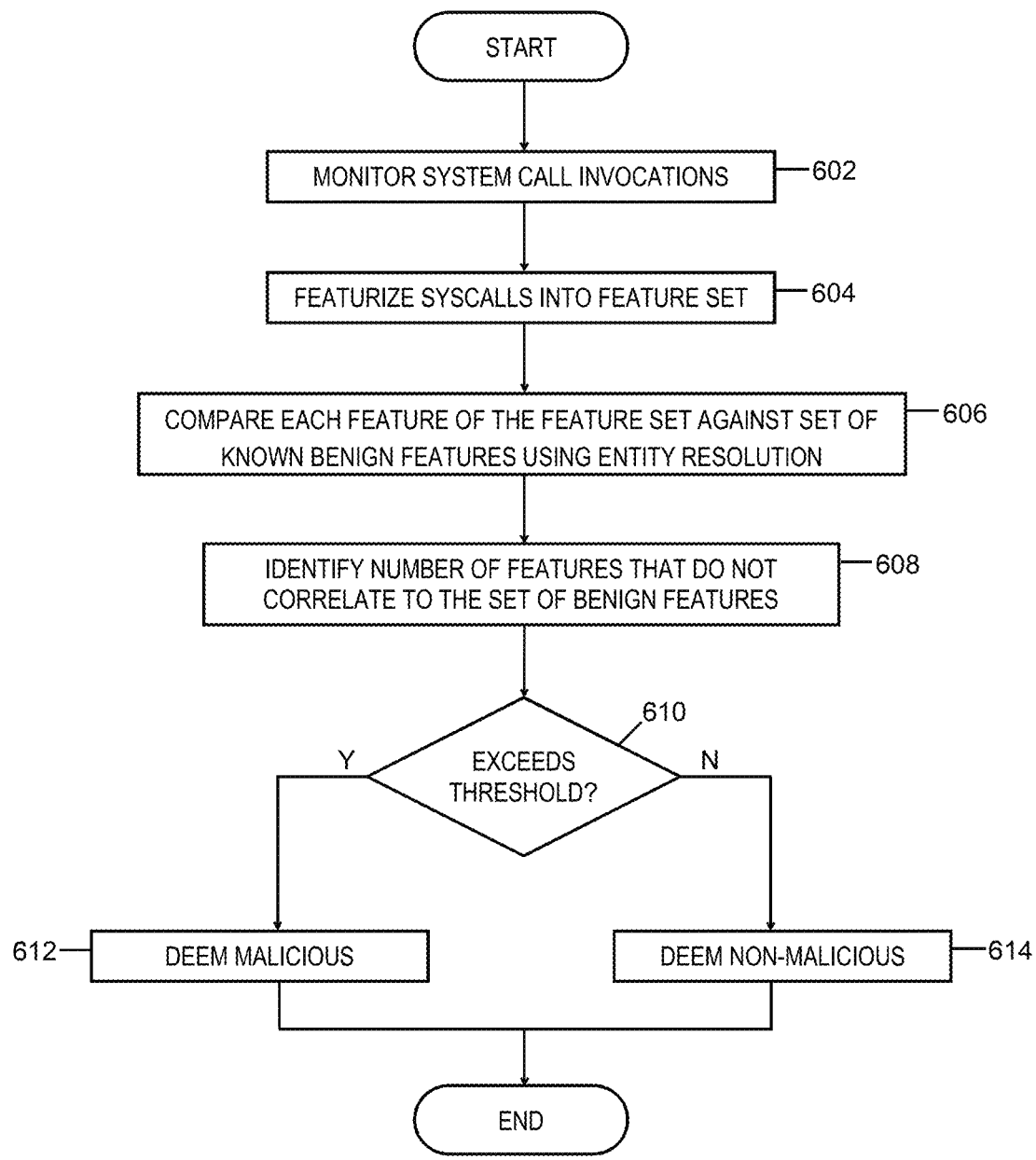
FIGS. 6A-6B depict aspects of assessing maliciousness of a subject digital file on a computer system, in accordance with aspects described herein.

FIG. 6A depicts an example method for assessing maliciousness of a subject digital file on a computer system, in accordance with aspects described herein. In some examples, the process is performed by one or more computer systems, such as those described herein, which may include one or more computer systems that builds a whitelist of benign features, renders the subject digital file, and/or one or more other computer systems. In some examples, the computer system performing the method of FIG. 6A is different from the computer system on which the digital file is processed, for instance is a host system of a guest in which the digital file is processed, as one example, though in other examples the computer system processing the digital file is the same as the computer system that performs the method of FIG. 6A.

The process includes monitoring system call invocations made to an operating system of the computer system (on which the digital file resides) by an application as the application processes the digital file (602). The digital file is of a defined file type with which the application is associated for processing digital files of the defined file type.

The process automatically featurizes the system call invocations into a set of features corresponding to the digital file (604). Automatically featurizing each system call invocation of the system call invocations can include ascertaining a semantic action associated with the system call invocation, and recording the semantic action as a feature. An ascertained semantic action associated with α system call invocation of the system call invocations can include creation of a process or a file system operation selected from the group consisting of a file create, a file read, or a file write, as examples.

The process of FIG. 6A continues by comparing each feature of the set of features against benign features of a set of known benign features obtained based on benign digital files of the defined file type (606). In some examples, the comparing the features includes, for each feature of the set of features, applying entity resolution between the feature and one or more benign features of the set of known benign features to attempt to find a correlation between the feature and a benign feature of the set of known benign features representing a common semantic interaction between the application and the operating system. The set of known benign features is constructed as described below with reference to FIG. 6B, for instance.

The correlation between the feature and a benign feature of the set of known benign features can include a match between the feature and the benign feature or a merger between the feature and the benign feature based on the feature and the benign feature being deemed to differ syntactically but representing the common semantic interaction between the application and the operating system.

Based on the comparing, the process of FIG. 6A identifies a number of features of the set of features that do not correlate (match or merge) to any of the benign features of the set of known benign features (608). The process then determines maliciousness of the digital file based on the identified number of features that do not correlate to the set of known benign features. It determines whether that number exceeds a threshold (610). If so (610, Y), i.e. based on the identified number of features that do not correlate to the benign features of the set of known benign features being above the threshold number, the file is deemed malicious (612) and the process ends. Otherwise (610, N) the file is deemed non-malicious (614) and the process ends.

The digital file is in some examples a digital document, and the application is or includes a document viewer application. Processing the digital document can therefore include the document viewer rendering the digital document for view. By way of specific example, the digital document is a Portable Document File (PDF) digital document of an International Organization for Standardization (ISO) 32000-1 or 32000-2 standard. Alternatively, the application is an application of an office suite software package and the digital document is or includes a document of a file type native to or renderable by that office suite software package.

Figure 6B:
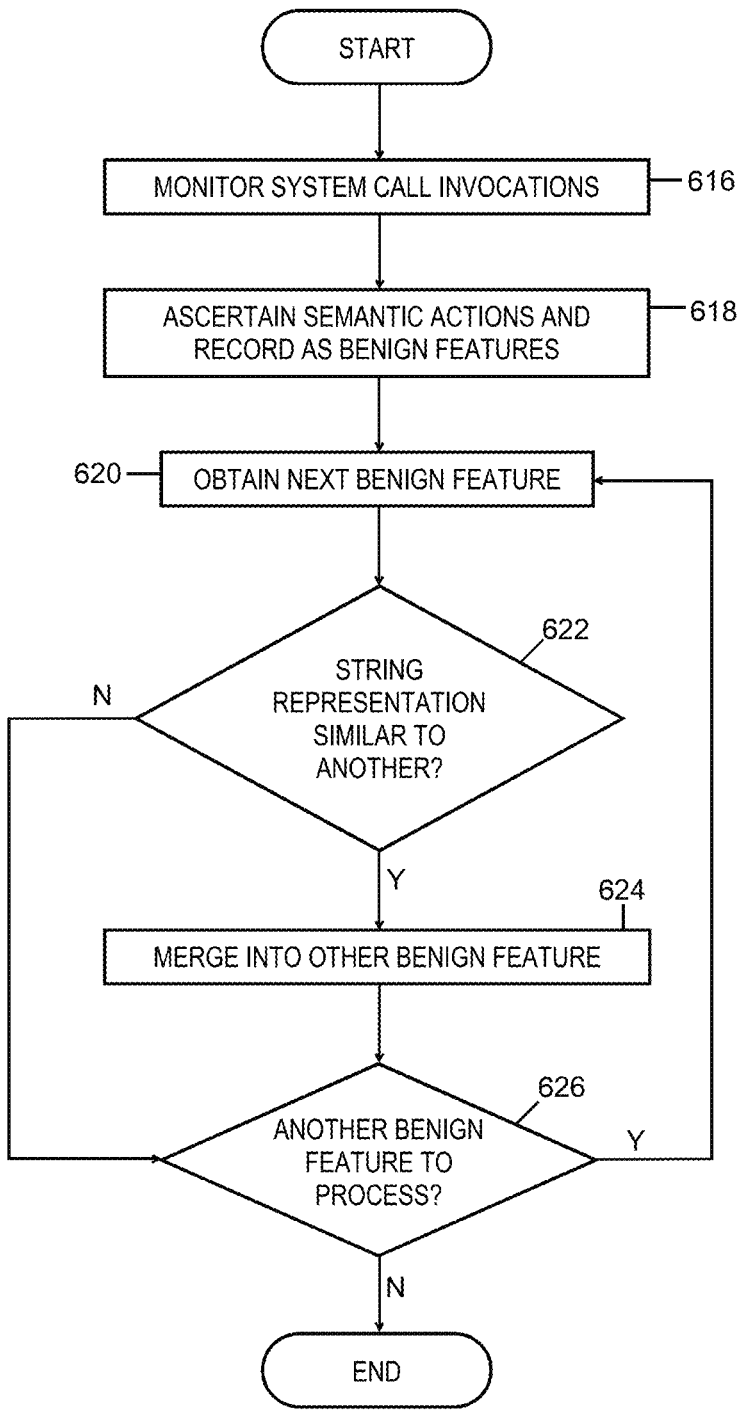

FIG. 6B depicts an example process for constructing a set of known benign features based on benign digital files of a defined file type, in accordance with aspects described herein. This could be performed by any computer system capable of running the same/similar application that will process digital files that are the subject of maliciousness assessments using the set of known benign features. In general, it may be necessary that the computer system run the same operating system since system calls invoked by an application may vary from operating system to operating system. In other words, it may not make sense to compare observations derived from applications running under different operating systems. For instance, the computer system that performs the process of FIG. 6B may be the computer system that performed the assessment of FIG. 6A or a different computer system, for instance one that distributes the constructed set of benign features as a whitelist or other data to one or more computer systems that perform the process of FIG. 6A.

The constructing includes monitoring system calls invoked by the application as it processes the benign digital files of the defined file type (616). The process ascertains semantic actions of the system calls and records the semantic actions as a plurality of benign features (618). The process then applies entity resolution against the plurality of benign features. It does this by merging, into a single benign feature of the set of known benign features, at least two benign features, of the plurality of benign features, that differ syntactically but represent a common semantic interaction between the application and the operating system. Thus, the process obtains a next benign feature to process (620) and determines whether a string representation of that benign feature is similar to a string representation of another benign feature (622). In some examples, determining whether the string representation of one benign feature is similar to the string representation of another benign feature includes determining whether the string representation of the one benign feature can be transformed into the string representation of the other benign feature using fewer than some threshold number of edit operations.

If it is determined at 622 that the string representation of the benign feature is similar to a string representation of another benign feature (622, Y), it merges the features together (624). Then, or if it was determined that the string representations are not similar, the process continues by determining whether there is another benign feature to process (626). If so (626, Y), the process returns to (620) to repeat the processing for a next benign feature. Otherwise (626, N), the process ends.

Figure 7A:
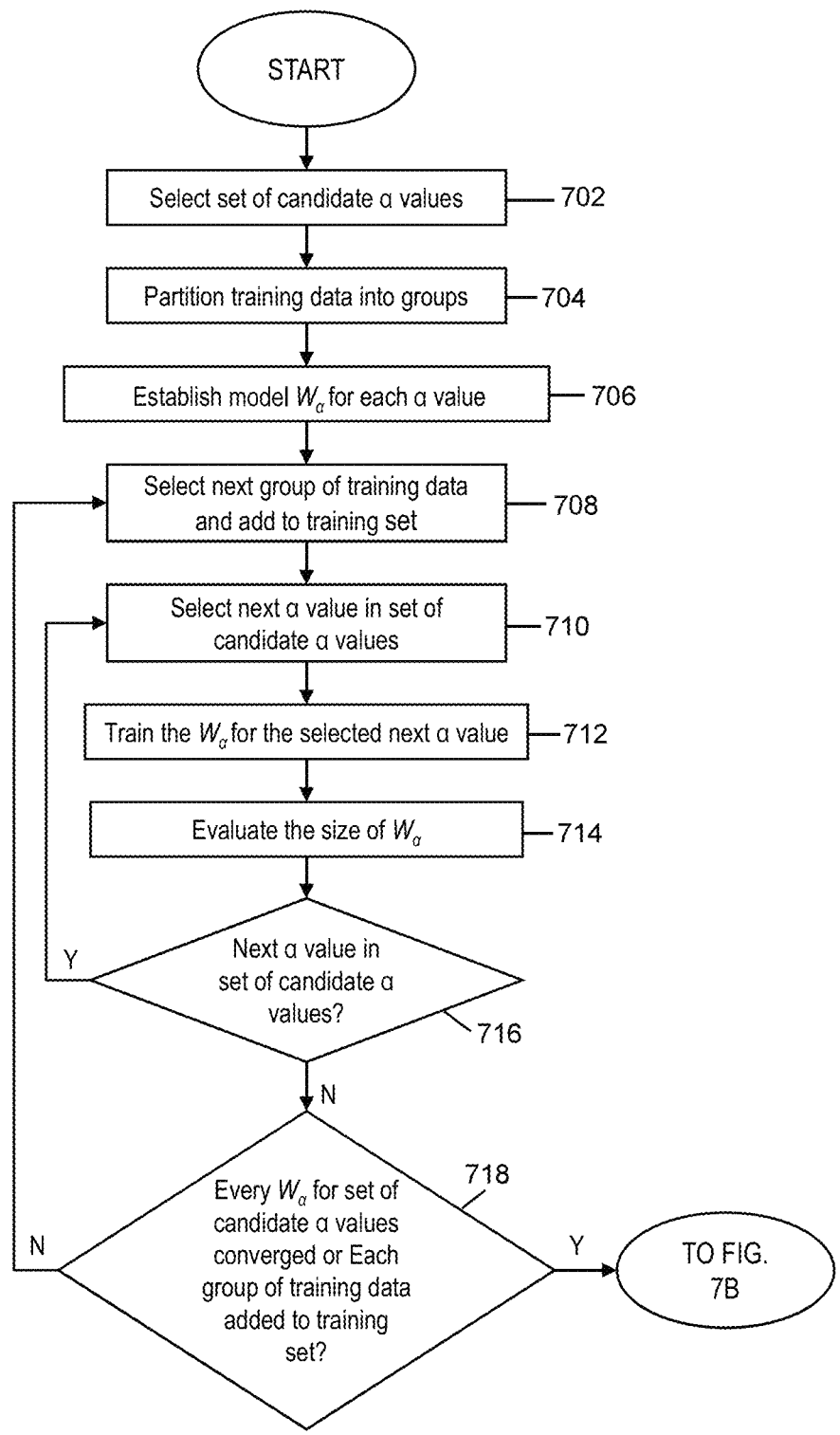
FIGS. 7A-7B depict example processes for establishing a threshold for determining equivalence between two features, in accordance with aspects described herein.
Figure 7B:
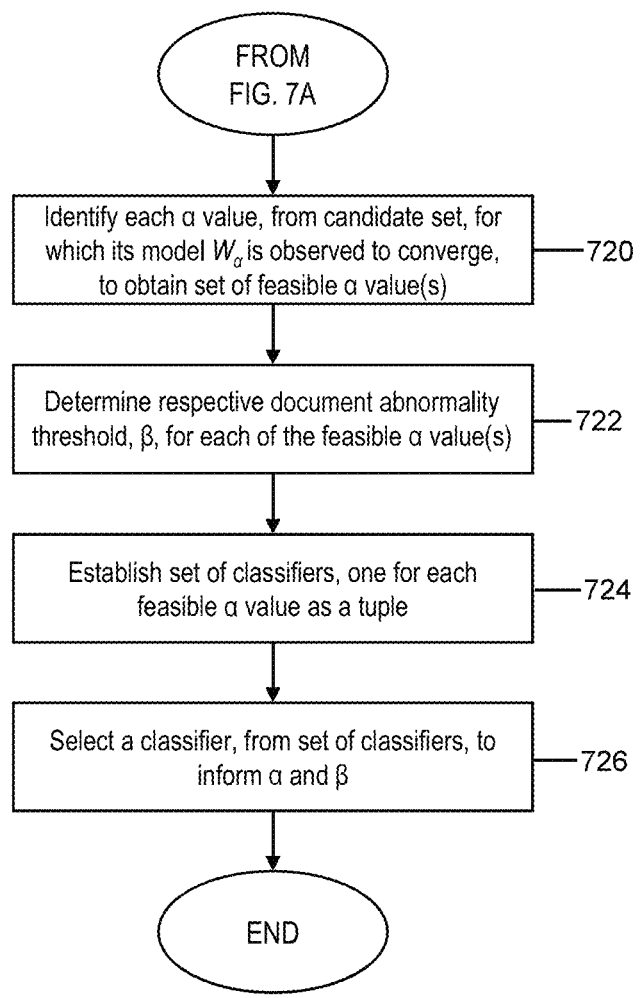
Figure 7C:
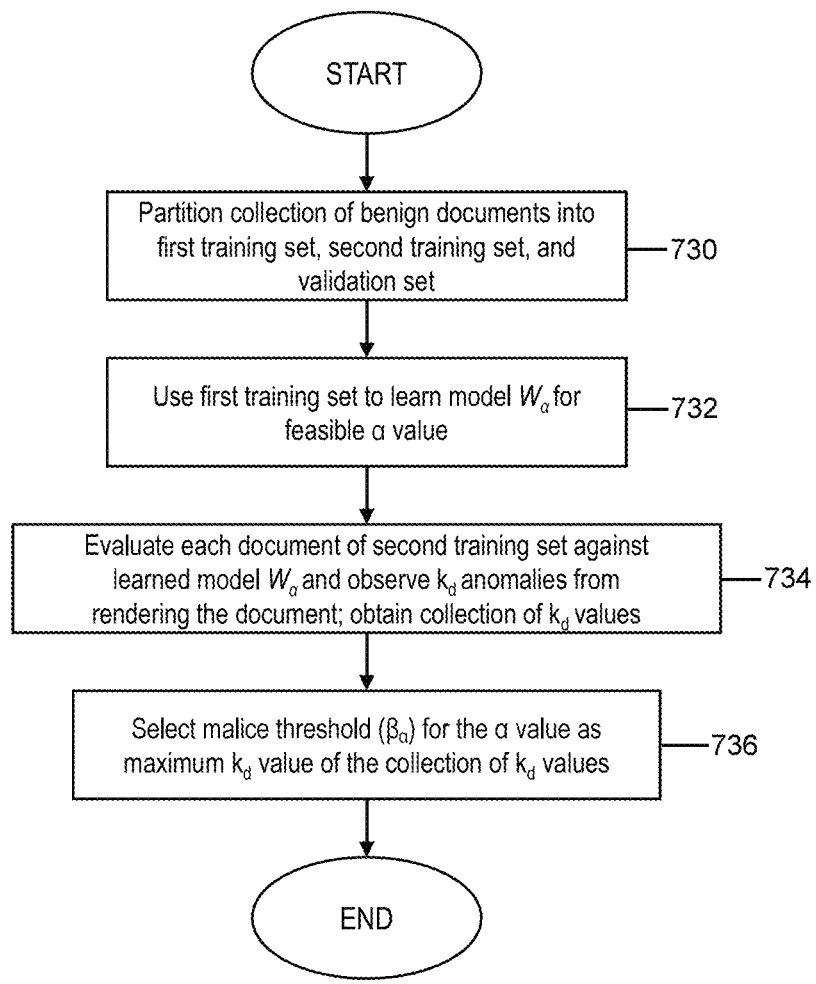
FIG. 7C depicts an example process for determining a document abnormality threshold, in accordance with aspects described herein.

FIGS. 7A-7C depict example processes in connection with threshold(s) determination as described herein. FIGS. 7A-7B depict example processes for establishing a threshold ($\alpha$) for determining equivalence between two features, in accordance with aspects described herein. FIG. 7C depicts an example process for determining a document abnormality threshold ($\beta$), in accordance with aspects described herein. In some examples, aspect(s) of these process(es) is/are performed by one or more computer systems, such as those described herein.

Accordingly, FIGS. 7A-7B depict example processes for establishing a feature merging threshold ($\alpha$) for determining equivalence between two features. In some examples, the features are determined from monitored system call invocations made to one or more operating systems by one or more applications as the one or more applications process one or more digital files of one or more defined file types with which the application is associated for processing digital files of the one or more defined file types.

The process of FIG. 7A selects (702) a set of candidate $\alpha$ values, partitions (704) training data into a plurality of groups, and establishes (706) a model $W_\alpha$ for each $\alpha$ value of the set of candidate $\alpha$ values. In the context of malicious document classification based on observed benign/malicious features, the model could be a whitelist of benign features. In any case, the established model for each such a value may initially be empty, as an example. The process then enters a loop (referred to in this context as the 'outer loop') to iteratively perform aspects for each of the groups of training data that were partitioned at 704. Specifically, the process selects (708) a next group of training data of the plurality of groups of training data and adds that selected next group of training data to a training set. The process then enters another loop (referred to in this context as the 'inner loop') to iteratively perform, for that selected next group of training data, aspects for each $\alpha$ value of the set of candidate $\alpha$ values selected at 702. Specifically, the process selects (710) a next $\alpha$ value in the set of candidate $\alpha$ values, trains (712) the model $W_\alpha$ for the $\alpha$ value using the training set, and evaluates (714) the size of $W_\alpha$, where size refers to a number of features included in the model. The process determines (716) whether there is a next $\alpha$ value in the set of candidate $\alpha$ values (i.e. whether there are any more $\alpha$ values to process from the set). If so (716, Y), the process iterates the inner loop, i.e. by looping back to 710 to select that next $\alpha$ value and process it (712, 714). Otherwise, if there is no next $\alpha$ value in the set, i.e. all $\alpha$ values in the set have been processed by iterating (716, N), the process continues by determining (718) whether (i) either or (ii) both of the following is true:

Every $W_\alpha$ for the set of candidate $\alpha$ values has converged;
Each of the groups of training data of the plurality of groups of the training data has been added to the training set.

If neither of the above two conditions are true (718, N), i.e. based on determining that (i) not every $W_\alpha$ for the set of candidate $\alpha$ values has converged and (ii) not each of the groups of training data of the plurality of groups of the training data has been added to the training set (i.e. at least one of the groups of training data has not yet been added to the training set), the process iterates/loops back to 708 to repeat the selecting and the adding (708) (i.e. to select a different next group of training data and add that to the training set) as well as the inner loop to process again each of the $\alpha$ values in the set of candidate $\alpha$ values, this time using the training set with the added group of training data.

In this manner, with each iteration of the outer loop 708 through 718, the processing trains (712), for each $\alpha$ value in the set of candidate $\alpha$ values, the $W_\alpha$ for the $\alpha$ value using the training set and evaluates (714) the size of $W_\alpha$, which retrains the $W_\alpha$ for the $\alpha$ value using the training set and evaluates the size of the retrained $W_\alpha$, and additionally then determines (718) again at least one of: whether every $W_\alpha$ for the set of candidate $\alpha$ values has converged, and whether each of the groups of training data of the plurality of groups of the training data has been added to the training set.

The iterative performance of this outer and inner looping halts based on determining that (i) every $W_\alpha$ for the set of candidate $\alpha$ values has converged or (ii) each of the groups of training data of the plurality of groups of the training data has been added to the training set. In either of these cases, the inquiry 718 is answered in the positive (718, Y) and the process continues to FIG. 7B to identify (720) each $\alpha$ value, from the set of candidate $\alpha$ values, for which its model $W_\alpha$ was observed to converge. It is noted that if, for all $\alpha$ values of the set of candidate $\alpha$ values, no model $W_\alpha$ is observed to converge, then it may be desired to augment the set of training data with more training data and restart the process of FIG. 7A. However, assuming one or more such $\alpha$ values are identified, then each is taken to be a feasible $\alpha$ value, and this produces a set of one or more feasible $\alpha$ values.

The process then determines (722), for each $\alpha$ value of the identified set of one or more feasible $\alpha$ values, a respective document abnormality threshold ($\beta$), which is a malice threshold in the context of malicious document classification as described herein. An example process for determining a document abnormality threshold $\beta$ for a feasible $\alpha$ value is depicted by FIG. 7C. The example of FIG. 7C is presented in the context of digital document classification and the document abnormality threshold is a malice threshold. Referring to FIG. 7C, the process includes (i) partitioning (730) a collection of benign documents into a first training set, a second training set, and a validation set, (ii) learning (732), using the first training set, a model $W_\alpha$ for the feasible $\alpha$ value, the model being a learned whitelist of features, (iii) evaluating (734) each document d of the second training set against the learned whitelist $W_\alpha$ for the feasible $\alpha$ value to observe therefrom a number of anomalies $k_d$ resulting from rendering of the document d, and obtaining, from the running, a collection of $k_d$ values, each corresponding to a respective document d of the second training set, and (iv) selecting (736) the malice threshold ($\beta_\alpha$) for the $\alpha$ value as the maximum $k_d$ value of the collection of $k_d$ values.

Referring back to FIG. 7B, after determining (at 722) a respective document abnormality threshold for each of the feasible $\alpha$ value, the process establishes (724) a set of classifiers. Each classifier of the set of classifiers corresponds to a respective feasible $\alpha$ value of the set of feasible $\alpha$ values, and is defined by a tuple corresponding to the feasible $\alpha$ value. Each tuple includes the feasible $\alpha$ value, the document abnormality threshold $\beta$ determined for that feasible $\alpha$ value, and the learned model $W_\alpha$ for the feasible $\alpha$ value.

The process of FIG. 7B then selects/chooses (726) a classifier from the established set of classifiers to inform a selected $\alpha$ value and $\beta$ document abnormality threshold. Selecting the classifier includes, as an example, using the validation set to determine a false positive rate of each classifier of the established set of classifiers, and selecting, as the selected classifier, the classifier of the established set of classifiers with the lowest determined false-positive rate. In some examples, if there is a tie (more than one classifier has the lowest determined false-positive rate), then selecting the classifier selects the classifier, of the more than one classifier, having the lowest feasible α value as part of its tuple.

Although various examples are provided, variations are possible without departing from a spirit of the claimed aspects.

Figure 8:
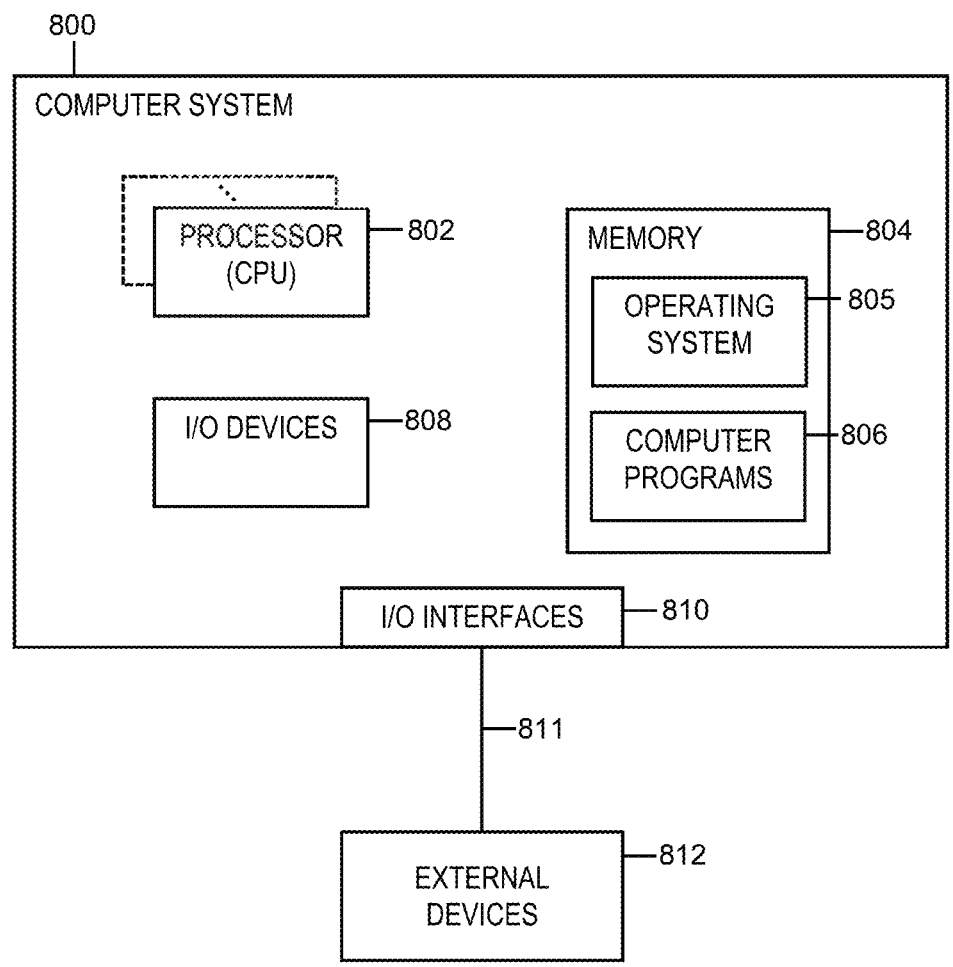
FIG. 8 depicts one example of a computer system and associated devices to incorporate and/or use aspects described herein.

Processes described herein may be performed singly or collectively by one or more computer systems. FIG. 8 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by Intel Corporation (Santa Clara, California, USA) or ARM Holdings plc (Cambridge, England, United Kingdom), as examples.

FIG. 8 shows a computer system 800 in communication with external device(s) 812. Computer system 800 includes one or more processor(s) 802, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 802 can also include register(s) to be used by one or more of the functional components. Computer system 800 also includes memory 804, input/output (I/O) devices 808, and I/O interfaces 810, which may be coupled to processor(s) 802 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 804 can be or include main or system memory (e.g. Random Access Memory) used in the execution of program instructions, storage device(s) such as hard drive(s), flash media, or optical media as examples, and/or cache memory, as examples. Memory 804 can include, for instance, a cache, such as a shared cache, which may be coupled to local caches (examples include L1 cache, L2 cache, etc.) of processor(s) 802. Additionally, memory 804 may be or include at least one computer program product having a set (e.g., at least one) of program modules, instructions, code or the like that is/are configured to carry out functions of embodiments described herein when executed by one or more processors.

Memory 804 can store an operating system 805 and other computer programs 806, such as one or more computer programs/applications that execute to perform aspects described herein. Specifically, programs/applications can include computer readable program instructions that may be configured to carry out functions of embodiments of aspects described herein.

Examples of I/O devices 808 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (812) coupled to the computer system through one or more I/O interfaces 810.

Computer system 800 may communicate with one or more external devices 812 via one or more I/O interfaces 810. Example external devices include a keyboard, a pointing device, a display, and/or any other devices that enable a user to interact with computer system 800. Other example external devices include any device that enables computer system 800 to communicate with one or more other computing systems or peripheral devices such as a printer. A network interface/adapter is an example I/O interface that enables computer system 800 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Washington, U.S.A.).

The communication between I/O interfaces 810 and external devices 812 can occur across wired and/or wireless communications link(s) 811, such as Ethernet-based wired or wireless connections. Example wireless connections include cellular, Wi-Fi, Bluetooth®, proximity-based, near-field, or other types of wireless connections. More generally, communications link(s) 811 may be any appropriate wireless and/or wired communication link(s) for communicating data.

Particular external device(s) 812 may include one or more data storage devices, which may store one or more programs, one or more computer readable program instructions, and/or data, etc. Computer system 800 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 800 may be operational with numerous other general purpose or special purpose computing system environments or configurations. Computer system 800 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

The present invention may be a system, a method, and/or a computer program product, any of which may be configured to perform or facilitate aspects described herein.

In some embodiments, aspects of the present invention may take the form of a computer program product, which may be embodied as computer readable medium(s). A computer readable medium may be a tangible storage device/medium having computer readable program code/instructions stored thereon. Example computer readable storage medium(s) include, but are not limited to, electronic, magnetic, optical, or semiconductor storage devices or systems, or any combination of the foregoing. Example embodiments of a computer readable medium include a hard drive or other mass-storage device, an electrical connection having wires, random access memory (RAM), read-only memory (ROM), erasable-programmable read-only memory such as EPROM or flash memory, an optical fiber, a portable computer disk/diskette, such as a compact disc read-only memory (CD-ROM) or Digital Versatile Disc (DVD), an optical storage device, a magnetic storage device, or any combination of the foregoing. The computer readable medium may be readable by a processor, processing unit, or the like, to obtain data (e.g. instructions) from the medium for execution. In a particular example, a computer program product is or includes one or more computer readable media that includes/stores computer readable program code to provide and facilitate one or more aspects described herein.

As noted, program instruction contained or stored in/on a computer readable medium can be obtained and executed by any of various suitable components such as a processor of a computer system to cause the computer system to behave and function in a particular manner. Such program instructions for carrying out operations to perform, achieve, or facilitate aspects described herein may be written in, or compiled from code written in, any desired programming language. In some embodiments, such programming language includes object-oriented and/or procedural programming languages such as C, C++, C#, Java, etc.

Program code can include one or more program instructions obtained for execution by one or more processors. Computer program instructions may be provided to one or more processors of, e.g., one or more computer systems, to produce a machine, such that the program instructions, when executed by the one or more processors, perform, achieve, or facilitate aspects of the present invention, such as actions or functions described in flowcharts and/or block diagrams described herein. Thus, each block, or combinations of blocks, of the flowchart illustrations and/or block diagrams depicted and described herein can be implemented, in some embodiments, by computer program instructions.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   selecting a feature merging threshold ($\alpha$), from a set of candidate $\alpha$ values, the set comprising multiple $\alpha$ values, and the feature merging threshold $\alpha$ being for determining equivalence between two features, wherein the selecting considers all of the multiple $\alpha$ values together in training respective model whitelists for the multiple $\alpha$ values, and wherein the selecting comprises:
   partitioning training data into a plurality of groups;
   establishing a respective model $W_\alpha$ for each $\alpha$ value of the set of candidate $\alpha$ values, the establishing producing multiple model $W_\alpha$, each corresponding to an $\alpha$ value of the multiple $\alpha$ values;
   iteratively performing, using $\alpha$ training set:
      selecting a next group of training data of the plurality of groups of training data;
      adding the selected next group of training data to the training set;
      for each $\alpha$ value in the set of candidate $\alpha$ values:
         training the $W_\alpha$ for the $\alpha$ value using the training set with the added selected next group of training data, wherein the training comprises (i) monitoring, by hooking machine instructions executing on a system, function calls invoked by an application based on the application opening and rendering documents of the training set, and (i) merging features, determined from the monitoring, according to the $\alpha$ value, to produce the trained $W_\alpha$ for the $\alpha$ value; and
         evaluating a size of $W_\alpha$, the size comprising a number of features included in the model after the training the $W_\alpha$ for the $\alpha$ value using the training set with the added selected next group of training data;
      wherein whether to continue the iteratively performing is based at least in part on the evaluated size of every $W_\alpha$ for the set of candidate $\alpha$ values as a result of the training; and
   choosing the feature merging threshold $\alpha$ based on the iteratively performing.

2. The method of claim 1, wherein the iteratively performing further comprises determining at least one selected from the group consisting of:
   whether every $W_\alpha$ for the set of candidate $\alpha$ values has converged; and
   whether each of the groups of training data of the plurality of groups of the training data has been added to the training set.

3. The method of claim 2, wherein based on determining that not every $W_\alpha$ for the set of candidate $\alpha$ values has converged, and further on determining that at least one of the groups of training data of the plurality of groups of the training data has not been added to the training set, the iteratively performing repeats the:
  (i) selecting, to select a different next group;
  (ii) adding, to add that different next group to the training set;
  (iii) for each $\alpha$ value in the set of candidate $\alpha$ values: training the $W_\alpha$ for the $\alpha$ value using the training set and evaluating the size of $W_\alpha$, wherein repeating the training retrains the $W_\alpha$ for the $\alpha$ value using the training set and wherein repeating the evaluating evaluates the size of the retrained $W_\alpha$; and
  (iv) determining again at least one selected from the group consisting of: whether every $W_\alpha$ for the set of candidate $\alpha$ values has converged; and whether each of the groups of training data of the plurality of groups of the training data has been added to the training set.

4. The method of claim 3, wherein the iteratively performing halts based on determining that (i) every $W_\alpha$ for the set of candidate $\alpha$ values has converged or (ii) each of the groups of training data of the plurality of groups of the training data has been added to the training set, and wherein the method further comprises, based on halting the iteratively performing, identifying each $\alpha$ value, from the set of candidate $\alpha$ values, for which its model $W_\alpha$ is observed to converge, to produce a set of one or more feasible $\alpha$ values.

5. The method of claim 4, further comprising determining, for each feasible $\alpha$ value of the identified set of one or more feasible $\alpha$ values, a respective document abnormality threshold ($\beta_\alpha$), the determining a document abnormality threshold $\beta_\alpha$ for a feasible $\alpha$ value comprising:
  partitioning a collection of benign documents into a first training set, a second training set, and a validation set;
  learning, using the first training set, a model $W_\alpha$ for the feasible $\alpha$ value, the model $W_\alpha$ being a learned whitelist of features;
  for each document d of the second training set, monitoring by a dynamic analyzer hooking machine instructions executing on a computer system, function calls invoked by at least one application based on the at least one application opening and rendering the document d;
  observing, for each document d of the second training set and using the learned whitelist $W_\alpha$ for the feasible $\alpha$ value, a number of anomalies $k_d$ resulting from the opening and rendering of the document d, and obtaining a collection of $k_d$ values, each corresponding to a respective document d of the second training set; and
  selecting the document abnormality threshold ($\beta_\alpha$) for the $\alpha$ value as a maximum $k_d$ value of the collection of $k_d$ values.

6. The method of claim 5, further comprising establishing a set of classifiers, each classifier of the set of classifiers corresponding to a respective feasible $\alpha$ value of the set of feasible $\alpha$ values, and being defined by a tuple corresponding to the feasible $\alpha$ value, wherein each tuple comprises the feasible $\alpha$ value, the document abnormality threshold $\beta_\alpha$ determined for that feasible $\alpha$ value, and the learned whitelist $W_\alpha$ for the feasible $\alpha$ value.

7. The method of claim 6, wherein the choosing the feature merging threshold $\alpha$ comprises:
  selecting a classifier from the established set of classifiers, the selecting the classifier comprising:
    using the validation set to determine a false positive rate of each classifier of the established set of classifiers; and
    selecting, as the selected classifier, the classifier of the established set of classifiers with a lowest determined false-positive rate, wherein the chosen feature merging threshold $\alpha$ is the $\alpha$ value of the selected classifier.

8. The method of claim 7, wherein based on more than one classifier having the lowest determined false-positive rate, the selecting the classifier selects the classifier, of the more than one classifier, having a lowest feasible $\alpha$ value as part of its tuple.

9. The method of claim 1, wherein the two features between which the equivalence is to be determined are determined from monitored system call invocations made to one or more operating systems by one or more applications as the one or more applications process one or more digital files of one or more defined file types with which the one or more applications are associated for processing digital files of the one or more defined file types.

10. A computer program product comprising:
  a non-transitory computer readable storage medium storing instructions for execution to perform a method comprising:
    selecting a feature merging threshold ($\alpha$), from a set of candidate $\alpha$ values, the set comprising multiple $\alpha$ values, and the feature merging threshold $\alpha$ being for determining equivalence between two features, wherein the selecting considers all of the multiple $\alpha$ values together in training respective model whitelists for the multiple $\alpha$ valves, and wherein the selecting comprises:
      partitioning training data into a plurality of groups;
      establishing a respective model $W_\alpha$ for each $\alpha$ value of the set of candidate $\alpha$ values, the establishing producing multiple model $W_\alpha$, each corresponding to an $\alpha$ value of the multiple $\alpha$ values;
      iteratively performing, using $\alpha$ training set:
        selecting a next group of training data of the plurality of groups of training data;
        adding the selected next group of training data to the training set;
        for each $\alpha$ value in the set of candidate $\alpha$ values:
          training the $W_\alpha$ for the $\alpha$ value using the training set with the added selected next group of training data, wherein the training comprises (i) monitoring, by hooking machine instructions executing on a system, function calls invoked by an application based on the application opening and rendering documents of the training set, and (i) merging features, determined from the monitoring, according to the $\alpha$ value, to produce the trained $W_\alpha$ for the $\alpha$ value; and
          evaluating a size of $W_\alpha$, the size comprising a number of features included in the model after the training the $W_\alpha$ for the $\alpha$ value using the training set with the added selected next group of training data;
        wherein whether to continue the iteratively performing is based at least in part on the evaluated size of every $W_\alpha$ for the set of candidate $\alpha$ values as a result of the training; and
      choosing the feature merging threshold $\alpha$ based on the iteratively performing.

11. The computer program product of claim 10, wherein: the iteratively performing further comprises determining at least one selected from the group consisting of:
  whether every $W_\alpha$ for the set of candidate $\alpha$ values has converged; and whether each of the groups of training data of the plurality of groups of the training data has been added to the training set; and based on determining that not every $W_\alpha$ for the set of candidate $\alpha$ values has converged, and further on determining that at least one of the groups of training data of the plurality of groups of the training data has not been added to the training set, the iteratively performing repeats the:

(i) selecting, to select a different next group;
(ii) adding, to add that different next group to the training set;
(iii) for each $\alpha$ value in the set of candidate $\alpha$ values: training the $W_\alpha$ for the $\alpha$ value using the training set and evaluating the size of $W_\alpha$, wherein repeating the training retrains the $W_\alpha$ for the $\alpha$ value using the training set and wherein repeating the evaluating evaluates the size of the retrained $W_\alpha$; and
(iv) determining again at least one selected from the group consisting of: whether every $W_\alpha$ for the set of candidate $\alpha$ values has converged; and whether each of the groups of training data of the plurality of groups of the training data has been added to the training set.

12. The computer program product of claim 11, wherein the iteratively performing halts based on determining that (i) every $W_\alpha$ for the set of candidate $\alpha$ values has converged or (ii) each of the groups of training data of the plurality of groups of the training data has been added to the training set, and wherein the method further comprises, based on halting the iteratively performing, identifying each $\alpha$ value, from the set of candidate $\alpha$ values, for which its model $W_\alpha$ is observed to converge, to produce a set of one or more feasible $\alpha$ values.

13. The computer program product of claim 12, wherein the method further comprises determining, for each feasible $\alpha$ value of the identified set of one or more feasible $\alpha$ values, a respective document abnormality threshold ($\beta_\alpha$), the determining a document abnormality threshold $\beta_\alpha$ for a feasible $\alpha$ value comprising:

partitioning a collection of benign documents into a first training set, a second training set, and a validation set;

learning, using the first training set, a model $W_\alpha$ for the feasible $\alpha$ value, the model $W_\alpha$ being a learned whitelist of features;

for each document d of the second training set, monitoring, by a dynamic analyzer hooking machine instructions executing on a computer system, function calls invoked by at least one application based on the at least one application opening and rendering the document d;

observing, for each document d of the second training set and using the learned whitelist $W_\alpha$ for the feasible $\alpha$ value, a number of anomalies $k_d$ resulting from the opening and rendering of the document d, and obtaining a collection of $k_d$ values, each corresponding to a respective document d of the second training set; and selecting the document abnormality threshold ($\beta_\alpha$) for the $\alpha$ value as a maximum $k_d$ value of the collection of $k_d$ values.

14. The computer program product of claim 13, wherein the method further comprises establishing a set of classifiers, each classifier of the set of classifiers corresponding to a respective feasible $\alpha$ value of the set of feasible $\alpha$ values, and being defined by a tuple corresponding to the feasible $\alpha$ value, wherein each tuple comprises the feasible $\alpha$ value, the document abnormality threshold $\beta_\alpha$ determined for that feasible $\alpha$ value, and the learned whitelist $W_\alpha$ for the feasible $\alpha$ value, and wherein the choosing the feature merging threshold $\alpha$ comprises:

selecting a classifier from the established set of classifiers, the selecting the classifier comprising:
using the validation set to determine a false positive rate of each classifier of the established set of classifiers; and
selecting, as the selected classifier, the classifier of the established set of classifiers with $\alpha$ lowest determined false-positive rate, wherein the chosen feature merging threshold $\alpha$ is the $\alpha$ value of the selected classifier.

15. The computer program product of claim 10, wherein the two features between which the equivalence is to be determined are determined from monitored system call invocations made to one or more operating systems by one or more applications as the one or more applications process one or more digital files of one or more defined file types with which the one or more applications are associated for processing digital files of the one or more defined file types.

16. A computer system configured to perform a method, the method comprising:

selecting a feature merging threshold ($\alpha$), from a set of candidate $\alpha$ values, the set comprising multiple $\alpha$ values, and the feature merging threshold $\alpha$ being for determining equivalence between two features, wherein the selecting considers all of the multiple $\alpha$ values together in training respective model whitelists for the multiple $\alpha$ values, and wherein the selecting comprises:

partitioning training data into a plurality of groups;
establishing a respective model $W_\alpha$ for each $\alpha$ value of the set of candidate $\alpha$ values, the establishing multiple model $W_\alpha$, each corresponding to an $\alpha$ value of the multiple $\alpha$ values;

iteratively performing, using $\alpha$ training set:
selecting a next group of training data of the plurality of groups of training data;
adding the selected next group of training data to the training set;
for each $\alpha$ value in the set of candidate $\alpha$ values:
training the $W_\alpha$ for the $\alpha$ value using the training set with the added selected next group of training data, wherein the training comprises (i) monitoring, by hooking machine instructions executing on a system, function calls invoked by an application based on the application opening and rendering documents of the monitoring, according to the $\alpha$ value, to produce the trained $W_\alpha$ for the $\alpha$ value; and
evaluating a size of $W_\alpha$, the size comprising a number of features included in the model after the training the $W_\alpha$ for the $\alpha$ value using the training set with the added selected next group of training data;
wherein whether to continue the iteratively performing is based at least in part on the evaluated size of every $W_\alpha$ for the set of candidate $\alpha$ values as a result of the training; and
choosing the feature merging threshold $\alpha$ based on the iteratively performing.

17. The computer system of claim 16, wherein:
the iteratively performing further comprises determining at least one selected from the group consisting of:
whether every $W_\alpha$ for the set of candidate $\alpha$ values has converged; and whether each of the groups of training data of the plurality of groups of the training data has been added to the training set; and based on determining that not every $W_\alpha$ for the set of candidate α values has converged, and further on determining that at least one of the groups of training data of the plurality of groups of the training data has not been added to the training set, the iteratively performing repeats the:

(i) selecting, to select a different next group;
(ii) adding, to add that different next group to the training set;
(iii) for each α value in the set of candidate α values: training the $W_\alpha$ for the α value using the training set and evaluating the size of $W_\alpha$, wherein repeating the training retrains the $W_\alpha$ for the α value using the training set and wherein repeating the evaluating evaluates the size of the retrained $W_\alpha$; and
(iv) determining again at least one selected from the group consisting of: whether every $W_\alpha$ for the set of candidate α values has converged; and whether each of the groups of training data of the plurality of groups of the training data has been added to the training set;

the iteratively performing halts based on determining that (i) every $W_\alpha$ for the set of candidate α values has converged or (ii) each of the groups of training data of the plurality of groups of the training data has been added to the training set; and the method further comprises, based on halting the iteratively performing, identifying each α value, from the set of candidate α values, for which its model $W_\alpha$ is observed to converge, to produce a set of one or more feasible α values.

18. The computer system of claim 17, wherein the method further comprises determining, for each feasible α value of the identified set of one or more feasible α values, a respective document abnormality threshold ($\beta_\alpha$), the determining a document abnormality threshold $\beta_\alpha$ for a feasible α value comprising:

partitioning a collection of benign documents into a first training set, a second training set, and a validation set;

learning, using the first training set, a model $W_\alpha$ for the feasible α value, the model $W_\alpha$ being a learned whitelist of features;

for each document d of the second training set, monitoring by a dynamic analyzer hooking machine instructions executing on a computer system, function calls invoked by at least one application based on the at least one application opening and rendering the document d;

observing, for each document d of the second training set and using the learned whitelist $W_\alpha$ for the feasible α value, a number of anomalies $k_d$ resulting from the opening and rendering of the document d, and obtaining a collection of $k_d$ values, each corresponding to a respective document d of the second training set; and selecting the document abnormality threshold ($\beta_\alpha$) for the α value as a maximum $k_d$ value of the collection of $k_d$ values.

19. The computer system of claim 18, wherein the method further comprises establishing a set of classifiers, each classifier of the set of classifiers corresponding to a respective feasible α value of the set of feasible α values, and being defined by a tuple corresponding to the feasible α value, wherein each tuple comprises the feasible α value, the document abnormality threshold Ba determined for that feasible α value, and the learned whitelist $W_\alpha$ for the feasible α value, and wherein the choosing the feature merging threshold α comprises:

selecting a classifier from the established set of classifiers, the selecting the classifier comprising:
using the validation set to determine a false positive rate of each classifier of the established set of classifiers; and
selecting, as the selected classifier, the classifier of the established set of classifiers with α lowest determined false-positive rate, wherein the chosen feature merging threshold α is the α value of the selected classifier.

20. The computer system of claim 16, wherein the two features between which the equivalence is to be determined are determined from monitored system call invocations made to one or more operating systems by one or more applications as the one or more applications process one or more digital files of one or more defined file types with which the one or more applications are associated for processing digital files of the one or more defined file types.

* * * * *

UNITED STATES PATENT AND TRADEMARK OFFICE
CERTIFICATE OF CORRECTION

| | | |
|---|---|---|
| PATENT NO. | : 12,131,230 B1 | Page 1 of 1 |
| APPLICATION NO. | : 16/984648 | |
| DATED | : October 29, 2024 | |
| INVENTOR(S) | : Scofield et al. | |

It is certified that error appears in the above-identified patent and that said Letters Patent is hereby corrected as shown below:

In the Claims

Column 28, Line 49: Claim 16, Delete "the monitoring," and insert -- the training set, and (i) merging features, determined from the monitoring, --

Signed and Sealed this
Third Day of December, 2024

*Katherine Kelly Vidal*

Katherine Kelly Vidal
*Director of the United States Patent and Trademark Office*